US010919817B2

(12) United States Patent
Lu

(10) Patent No.: US 10,919,817 B2
(45) Date of Patent: Feb. 16, 2021

(54) PROCESS AND EQUIPMENT FOR HIGH-SPEED RECYCLING AND TREATMENT OF ORGANIC WASTES AND GENERATION OF ORGANIC FERTILIZER THEREBY

(71) Applicant: James Cheng-Shyong Lu, Huntington Beach, CA (US)

(72) Inventor: James Cheng-Shyong Lu, Huntington Beach, CA (US)

(*) Notice: Subject to any disclaimer, the term of this patent is extended or adjusted under 35 U.S.C. 154(b) by 271 days.

(21) Appl. No.: 16/011,489

(22) Filed: Jun. 18, 2018

(65) Prior Publication Data

US 2018/0370867 A1 Dec. 27, 2018

Related U.S. Application Data

(60) Provisional application No. 62/523,738, filed on Jun. 22, 2017.

(30) Foreign Application Priority Data

Oct. 19, 2017 (CN) .......................... 2017 1 0974726

(51) Int. Cl.
*C05G 3/60* (2020.01)
*B09B 3/00* (2006.01)
(Continued)

(52) U.S. Cl.
CPC .............. *C05G 3/60* (2020.02); *A01G 24/60* (2018.02); *B09B 3/0008* (2013.01);
(Continued)

(58) Field of Classification Search
CPC ... C05G 3/60; C05G 3/80; C05G 3/90; C05G 5/20; C05F 17/50; B09B 3/0016;
(Continued)

(56) References Cited

U.S. PATENT DOCUMENTS 5,439,577 A 8/1995 Weres et al.
7,077,937 B2 7/2006 Weres et al.
(Continued)

FOREIGN PATENT DOCUMENTS

CN 101508603 B 7/2013
CN 104148357 A 11/2014

*Primary Examiner* — Jennifer A Smith
(74) *Attorney, Agent, or Firm* — Mei & Mark LLP; Manni Li

(57) ABSTRACT

Methods and equipment for high-speed production and improving quality of liquid and solid organic fertilizers from organic solid wastes by (1) pre-treatment system, for purification, size reduction, and slurry generation, (2) HiSAP recycling system using slurry generated to form soluble compounds of easily degradable organics, and insoluble compounds of moderately degradable organics of mainly lignocellulosic materials, and production of organic radicals, reactive oxygen species including superoxygen, hydroperoxyl radical, hydrogen peroxide, and hydroxyl radical to thermally decomposing easily degradable organic and curing remaining compounds therein, and (3) product refining system to produce organic fertilizers, to enhance 7 major functions and capabilities including moisture absorption and holding, nutrients adsorption and holding, soil particles holding and conserving, soil air ventilation, soil water transmission, soil thermal insulation, and generation of plant growth stimulation agents, and pollution elimination as sterilizing pathogens and parasites, detoxicating toxic organics, and removing heavy metals therefrom.

8 Claims, 9 Drawing Sheets

(51) Int. Cl.
*A01G 24/60* (2018.01)
*C05F 17/50* (2020.01)
*C05G 3/80* (2020.01)
*C05G 3/90* (2020.01)
*C05G 5/20* (2020.01)

(52) U.S. Cl.
CPC .......... *B09B 3/0016* (2013.01); *B09B 3/0083* (2013.01); *C05F 17/50* (2020.01); *C05G 3/80* (2020.02); *C05G 3/90* (2020.02); *C05G 5/20* (2020.02); *Y02W 30/40* (2015.05)

(58) Field of Classification Search
CPC ..... B09B 3/0008; B09B 3/0083; A01G 24/60; Y02W 30/43
See application file for complete search history.

(56) References Cited

U.S. PATENT DOCUMENTS

| 8,945,353 B1 | 2/2015 | Fraim et al. |
| 2011/0179841 A1 | 7/2011 | Lu |

PROCESS AND EQUIPMENT FOR HIGH-SPEED RECYCLING AND TREATMENT OF ORGANIC WASTES AND GENERATION OF ORGANIC FERTILIZER THEREBY

CROSS-REFERENCE TO RELATED APPLICATIONS

The subject application claims priority on U.S. provisional application No. 62/523,738 filed on Jun. 22, 2017. Further, the subject application claims priority on Chinese Patent Application No. 201710974726.9 filed on Oct. 19, 2017 in China. All of the above-mentioned U.S. provisional application and Chinese priority applications are incorporated herein by reference.

BACKGROUND OF THE INVENTION

1. Field of the Invention

The present invention is in the field of waste treatment and organic fertilizer generation, particularly, high-speed physicochemical processes and equipment to produce high quality organic fertilizers from organic wastes.

2. Description of the Background Art

Traditional main stream technologies for recycling organic solid wastes, such as for the recovery of municipal solid wastes (MSW) and treatment plant sludge (i.e., biosolids), in developed countries are incineration with power generation, biochemical composting with solid organic fertilizer production, and landfill operation with methane production, where methane recovery from landfills is practiced only as a by-product from land disposal method. The above mentioned three major methods, i.e., incineration, composting, and landfill, are used widely but are still not desirable methods for organic wastes treatment/recycling, as reported in the literature, due to the fact that many of the secondary pollution problems are generated by these methods. Among the above three methods, the composting method usually generates less environmental impacts and meets the environmental goal of "Sustainable Development," therefore, becoming the technology of the choice for most developed and developing countries. According to the US EPA, the composting method for MSW treatment has increased from 0.1% to 8.1% from 1980 to 2010, an 8100% increase in 30 years, or an average of 270%/year of rate increase!

Application of the composting method for waste treatment requires a stringent waste pretreatment system to remove metals, plastics, and glasses, if any, in the wastes. The remaining waste materials after pretreatment, still in massive amount, are mainly mixed organics including mainly food wastes, waste paper, wood wastes, green wastes (here-in-after together called "Eco-Wastes" for the ease of discussions). The amount of Eco-Wastes usually comprises about 60% to 70% weight basis of the MSW generated in most developed countries. Most developed countries, such as the USA, are not selecting landfill and incineration as the favorable disposal methods for the Eco-Wastes in recent decades. Based on the rate increase of applying composting method for organic wastes recycling as mentioned above, the composting method is the most favorable technology of choice. The basic principles of conventional composting processes used for organic wastes recycling into organic fertilizers are biochemical methods involving mainly two processes: "Biodegradation and Curing", as widely reported in the open literature. "Biodegradation" in the organic fertilizers generation is relating to microorganism decomposition of the Easily Degradable Organics (which mainly include proteins, fats, and sugars) existing in the Eco-Wastes. After "Biodegradation", the remaining materials in the organic types of wastes are Moderately Degradable Organics (mainly contain lignocellulosic materials, i.e., lignin, hemicelluloses, and celluloses). During biodegradation, the biomass of the microorganisms is increased. The increased quantity of biomass, according to reports widely addressed in the open literature, is about half of the original weight quantity of the Easily Degradable Organics. This amount of biomass is also biodegradable, and will cause bad effects to soils when applied as organic fertilizer. This is why the second process "Curing" is used in the traditional composting method. "Curing" process in the traditional composting method is for a microorganism to use other microorganisms as food, thus reducing the Easily Degradable Organics gradually. Unfortunately, time period required for the "Curing" process is very lengthy, in the order of weeks to months for most organic types of waste. "Curing" in composting processes is often incomplete. During the curing process, if oxygen is insufficient, as usually happening in composting, odors and some toxic emissions will also be released. If some pathogens survive in the compost products, or their populations are high in the wastes, then they may exist in the final fertilizer products too. Most toxic recalcitrant organic compounds, heavy metals, pathogens, and weed seeds usually cannot be eliminated from the compost fertilizers by traditional "Biodegradation and Curing".

In summary, the traditional composting methods for Eco-Wastes recycling to generate organic fertilizers (composts) may inherent disadvantages such as:

(1) Complexity of waste physical characteristics (such as particle sizes, contents of non-biodegradable materials, moisture contents, densities), chemical characteristics (such as C/N ratios, types and concentration of chemical compounds), biological characteristics (such as types of indigenous microorganisms) and operational characteristics (such as reactor designs, mixing methods, oxidants and nutrients addition methods), could affect quality of organic fertilizers produced significantly. Poor qualities (main problems are impurity and incomplete biodegradation) have affected the use of composts by farmers.

(2) The time periods required for the traditional composting processes are extremely lengthy, with about one to two months or longer time periods needed for biodegradation and curing! Certain high-speed biochemical composting processes were developed in the past and widely reported in the open literature to fasten the biodegradation process to weeks. However, time periods of composting being shorten to weeks for compost production are still unacceptable for treatment of daily large quantities of wastes generated by a community. Lengthy time periods needed for composting will become bottlenecks for future use of the method as a main stream technology.

(3) Pathogens, heavy metals, toxic organic compounds and weed seeds in the wastes are usually cannot be removed by the conventional composting methods.

(4) Odors generated during conventional composting operation resulted in NIMBY (not-in-my-backyard) concerns, which already caused hundreds of composting plants throughout the world to shut down in the past.

Therefore, to develop a technology to overcome the above defects become urgently needed for the organic types of waste treatment. A non-traditional thermal-chemical method for organic fertilizer generation from wastes is disclosed in Chinese Patent CN101508603B to Lu, and is widely referred as a High-speed Recovery of Organic Solid Wastes, or called HiROS method in the open literature. The basic principle in the Chinese patent is to convert Eco-Wastes into organic fertilizers through the decomposition of the Easily Degradable Organics to release plant nutrients from the wastes, and to release the Moderately Degradable Organics to becoming major backbone ingredients of the solid organic fertilizer products. In order to achieve the above objectives, the patented process adopted a "partial wet oxidation" process to generate organic fertilizers directly from organic wastes. As reported, the method adopts combined hydrolysis and oxidation in a single high speed Stabilization Reactor with four compartments to avoid short-circuiting reaction effects and maintaining equivalent residual oxidant concentration at 1 to 6 ppm dissolved oxygen with the temperature between 140 to 300° C. for the partial oxidation reactions. After the partial oxidation processes, the patented process continues using steam explosion, and when necessary, also using a wide variety of chemical additives to increase the quality of products. By using the above processes, the process is able to produce higher quality of solid organic fertilizers within hours comparing to that of the traditional composting method. The patented process, as discussed therein, totally revolutionizes the traditional biochemical composting processes, which have been practiced by farmers with historical records for over four thousand years. Solid organic fertilizer products produced by the process claims the following advantages for the organic fertilizers produced, comparing to conventional methods: (1) higher water absorption capacity, (2) higher nutrient retention capability, (3) stronger soil particle attenuation capability, (4) higher thermal insulation capability, (5) higher air transmission capability, (6) higher water transmission capability, and (7) generating higher plant stimulating agents (such as humic acids, fulvic acids) for plant growing. Therefore, quality of organic fertilizer products can be greatly improved.

In practical application, however, CN101508603B could contain some problems requiring improvements, such as:

(1) the process basically uses a single flow process for different types of organic wastes. However even the same types of MSW may exist different waste characteristics such as MSW from restaurants may contain much higher salt and fat contents (which are undesirable in fertilizer products) than residential sources, so development of different processes for different waste types and sources may be needed.

(2) Waste materials contain a wide variety of organic species which have their own hydrolysis and oxidation rates. When wastes are conducted within a single reactor (called Stabilization Reactor in the Chinese patent) which could result in incomplete hydrolysis of certain species and under or over oxidation of the other species. One situation which the process may not be able to control with a single hydrolysis/oxidation reactor is incomplete decomposition of Easily Degradable Organics and over oxidation of the Moderately Degradable Organics.

(3) The process shows that a great amount of heat can be generated from the Stabilization Reactor. However, effective heat recovery methods are not provided in the process.

(4) For cost-effectiveness concern, air is used as the oxidant in the reactor in the process. Compressed air supply usually becomes the largest operational expenses (usually 60% or higher of the total operating costs) for the system of the process. If improvement methods can be developed, a great amount of costs can be saved.

(5) Using air to supply oxidants in the Stabilization Reactor to sustaining reactions, sufficient dissolved oxygen levels need to be maintained. The situation can be achieved only when contact time between oxygen and the solution is lengthy enough yet amount of input air quantity should low enough to save cost in the reactor. Currently, the process design cannot achieve the above goals, and therefore, the process still requires improvement.

(6) Effective dewatering methods are not included in the China Patent CN101508603B design which may cause the activation process used by the invention inefficient and require further thermal drying for product refining to meet the low fertilizer moisture requirements.

To solve the problems, redesign of the system as well as bench and pilot tests are necessary. The same inventor conducts years of the tests and files an improved patented system in Chinese Patent Application published as CN104148357A. In the improved system, most of the above-mentioned defects in CN101508603B are solved. Following examples are the major modifications in CN104148357A: (1) Different flow diagrams were developed with different unit processes for different waste categories. (2) The single Stabilization Reactor in the CN101508603B system was replaced by two types of reactors, i.e., Hydrolysis and Oxidation Reactors. (3) In order to enhance the hydrolysis reactions, two types of new acid catalysts are provided, when necessary, for the hydrolysis of Easily Degradable Organics. (4) The system was modified to maximize heat recovery by using heat pipe design for steam heat recovery to avoid air insulation effect. (5) Filter Press is used for more effective dewatering of treated materials. The dewatering process can remove water contents of the treated materials down to 30% or less moisture contents even for the most difficult waste material, such as municipal sludge, to dewater after waste treatment.

Although most of the limitations in CN101508603B has been improved in CN104148357A, the improved system still exists some problems requiring further improvements:

(1) Among the oxidants proposed in CN101508603B and CN104148357A, supply of pressurized air was still claimed to be the best environmental way and the most cost-effective method for oxidant supply. However, in order to oxidize and decompose most of the Easily Degradable Organics by pressurized air at elevated temperature, three problems occurred: (i) costs for generation of compressed air for the Reactors are very high, usually comprises about or over 60% of the system operation costs, which could affect the financial feasibility of the system comparing to other methods; (ii) difficulty for dissolution of oxygen to saturation at elevated temperatures within a short time period in the oxidation reactors. When dissolved oxidant levels are not high enough in the reactors, oxidation of the Easily Degradable Organics will not be rapid and complete. As a result, much higher volumes of the thermal reactors with sophisticated design for dissolution of oxygen become necessary; and (iii) due to large amounts of air are needed in the wet thermal reactors to maintain effective reactions at elevated temperatures (usually 190 to 230° C.), these reactors carry away a sizable amount of steam (or heat) causing a great need of energy and energy loss by the reactors.

(2) When the waste to be treated containing toxic organic compounds, then stronger oxidants such as hydrogen peroxide, higher oxidation temperatures, and longer treatment periods are needed for the treatment. Therefore, when incoming waste materials contain significant high levels of toxic organics, following problems may occur: (i) requiring the enlargement of the pressurized reactor volumes and wall thickness of the pressurized reactors due to more oxidants and higher temperatures needed in the reactors, thus further increase the treatment costs; (ii) when requiring the temperature beyond 300° C., other secondary pollutants such as dioxin could be generated and, therefore, causing a secondary pollution problem.

(3) The treatment system reported and designed in CN104148357A relies on the conventional waste separation/purification methods for the pretreatment of incoming wastes. This situation would affect the efficiency of pretreatment especially for waste types of MSW, restaurant wastes, domestic food wastes, etc., and affect the purity of Eco-Wastes to be recycled in the method of CN104148357A.

(4) Efficiencies of hydrolysis and oxidation reactors used in the process in CN104148357A may still require improvements due to some Easily Degradable Organics may be trapped in some Moderately Degradable Organics, such as in the food or agricultural wastes which proteins, fats and/or starches are trapped in the lignocelluloses, which cause incomplete degradation by the processes.

CN101508603B and CN104148357A are developed to replace the traditional composting process. As discussed above, the principle in CN101508603B is referred as "partial wet oxidation" processes which are using the hydrolysis and oxidation processes at elevated temperature and pressure to enhance the solubilization and decomposition of Easily Degradable organics, while leaving the Moderately Degradable Organics intact. The decomposition of the Readily Degradable Organics is based on the wet oxidation of dissolved oxygen generated in the thermal reactors.

CN101508603B has been modified in the method of CN104148357A by improvements of the pretreatment system and separation of the hydrolysis and partial wet oxidation processes. The decomposition of the Readily Degradable Organics is based on the wet oxidation of dissolved oxygen in the stabilization reactors and chain reactions of organic radicals generated in the hydrolysis reactor.

Through more than three years of pilot tests reported by CN104148357A, some limitations still exist which require further improvements. Among them, high costs of supplying pressurized air, lengthy oxidant dissolution period needed, heat loss by in sufficient medium used in the heat pipe for steam heat recovery, large reactor volumes required due to large air volume needed in the reactors, stronger oxidants and longer reaction time as well as higher temperatures are needed when toxic/recalcitrant organics present in wastes, and some Easily Degradable Organics may be trapped in the Moderately Degradable Organics causing incomplete decomposition problem, etc. are the most significant limitations of CN104148357A requiring improvements. To solve the above limitations, some revolutionary methods are needed to improve the treatment principles, and operational procedures.

One of the largest problems of CN104148357A come from the use of large amounts of pressurized air to supply oxidant (oxygen) which contains only about 21% of oxygen in the air and with relatively low levels of saturated solubility of oxygen in the solution, and lengthy time needed to reach solubility saturation condition in the reactors. In the Bench and pilot tests of the process of CN104148357A have shown that, for most types of organic wastes, the oxygen demand would need about 1.6 to 1.7 weight ratios of Easily Degradable Organics to oxygen. The above situations caused the use of a sizable quantity of pressurized air in the recycling system. Use of this large amount of air in the partial wet oxidation operation would increase significantly both capital and operation costs.

Further, in U.S. Pat. No. 5,439,577, an electrochemical water treatment device was developed, mainly for the purification of toxic organic compounds such as aromatic organic species, herbicides, insecticides, toluene, phenols, cresol, fluoroalkyl foaming agent, and oxidizable inorganic sulfur species in water at near neutral pH. The temperature used for the above patented process may be as high as 90° C., but the DO level is still insufficiently high and not in the optimum conditions for the oxidation of Easily Degradable Organics in solid wastes. In U.S. Pat. No. 7,077,937B2, electrochemical apparatus was suggested for the decontamination and/or disinfection of wastewater or air. In this patent an electrolyte between cathode and anode is used, which a metallic complex immobilized at or in a solid at the cathode side of the electrolyte, as opposed to the anode side is selected as catalyst. For the destruction of contaminants, the wastewater is contacted only to the cathode side, and let oxygen and H+ generated at the anode side to migrate (diffuse) through the electrolyte to the cathode side. This design may have disadvantages of slow supply of DO and H+ from the anode side for the OH. generation at the cathode side, and may hinder the Fenton Reactions by the regeneration of $Fe^{2+}$ from $Fe^{3+}$ due to absence of mixing action to increase the contact opportunities. In U.S. Pat. No. 8,945,353B1, use of pressurized influents premixed with oxidant gases such as ozone and oxygen to inject into electrolytic cells to form advanced oxidation reactions for the treatment of wastewater and agricultural runoff, as well as for the recovery of ammonia and urea was presented. It was reported that the strong turbulent flow created by the influent could form a cavitation of nanobubbles. Collapsing of the cavitation bubbles may produce ultraviolet oxidation of organics in the fluid. Turbulent flow also may add the migration of electron between cathodes and anodes for reactive oxygen species production.

However, these types of water, wastewater, air treatment systems may not be feasible for the treatment and recovery of resources for solid wastes. Due to high organic contents, oxidant demands are very high. Using premixed oxidant gases prepared at or only slightly higher than atmospheric pressures cannot reach to the dissolved oxidant levels needed. Further, the existing patented processes, especially designed for the decomposition or disinfection purposes, usually select the temperature at room temperature ranges and pressures at atmospheric conditions which are insufficient for solid wastes treatment purposes.

SUMMARY OF THE INVENTION

The present invention provides new and improved processes and equipment over both CN101508603B and CN104148357A. The present invention has also been developed to replace and to improve on the process as disclosed in U.S. Patent Application Publication No. 2011/0179841A1 published on Jul. 28, 2011 with application Ser. No. 12/694,842 filed on Jan. 27, 2010, which is incorporated herein by reference.

The objectives of the present invention are to provide a high-speed physicochemical method to replace the traditional biochemical composting methods for treating solid wastes and conversion of wastes into high quality organic fertilizers. A complete recycling system of the present invention includes three major systems: (1) pretreatment system, (2) high-speed stabilization and activation system (hereinafter referred to as HiSAP system), and (3) product refining system.

In the pretreatment system, instead of using the traditional dry separation and classification method for purifying and conditioning incoming wastes, wet separation and classification methods are used. In the HiSAP system, reactive oxygen, hydroxyl and organic radicals are generated in the HiSAP reactors for rapid and effective decomposition of unwanted components in the incoming wastes. The HiSAP system is also used to enhance the qualities of the remaining organics for organic fertilizer production. The products from the HiSAP system are further refined in the product refining system for generating commercial organic fertilizers with very high water and nutrient holding capabilities, high thermal insulation and water transmission capabilities, as well as high contents of plant stimulating compounds including high levels of humic and fluvic acids.

The present invention improves over CN101508603B and CN104148357A in that (1) replacement of traditional dry processes for waste separation/purification by the new wet processes, so impurity of materials for subsequent processing can be improved and automatic processing instead of manual processing can be used, (2) replacement of external pressurized air as oxidant by a relative more cost-effective method of oxidant supply by reactive oxygen species (ROS) generated from water right in the reactors, (3) provision of multiple organic fertilizers refining systems for the improvement of qualities of both solid and liquid fertilizers generated, and (4) utilizations of heat pipe design for the energy recovery with special selected heat-pipe media. Advantages of the present invention comparing to the methods in the two Chinese patent and application publication are reduction of pressurized air supply to reduce operation costs, higher efficiency and reduction of reactor volumes to reduce capital costs, reduction of temperature level requirements to reduce of energy needs, increase of heat recovery efficiency, increase of reaction rates, and further improvements of product qualities for both solid and liquid organic fertilizers produced.

BRIEF DESCRIPTION OF THE DRAWINGS

The invention will be described in more detail by way of example only, with reference to the accompanying drawings. The following drawings are provided.

DETAILED DESCRIPTION OF THE INVENTION

1. Basic Treatment Principles, Operational Procedures and Objectives

By solving the above-mentioned problems associated with the existing processes, the present invention uses Reactive Oxygen Species (ROS), including hydroxyl radicals, singlet oxygen, superoxide, and hydrogen peroxide generated directly from water in the reactors as oxidants to decompose Readily Degradable Organics. Part of the Readily Degradable Organics can be also degraded by various organic radicals produced in the thermal reactors of the subject invention design through chain reactions. Detailed descriptions of the ROS generation, reactions of ROS with organics, chain reactions of organic radicals are provided as follows.

Figure 1:
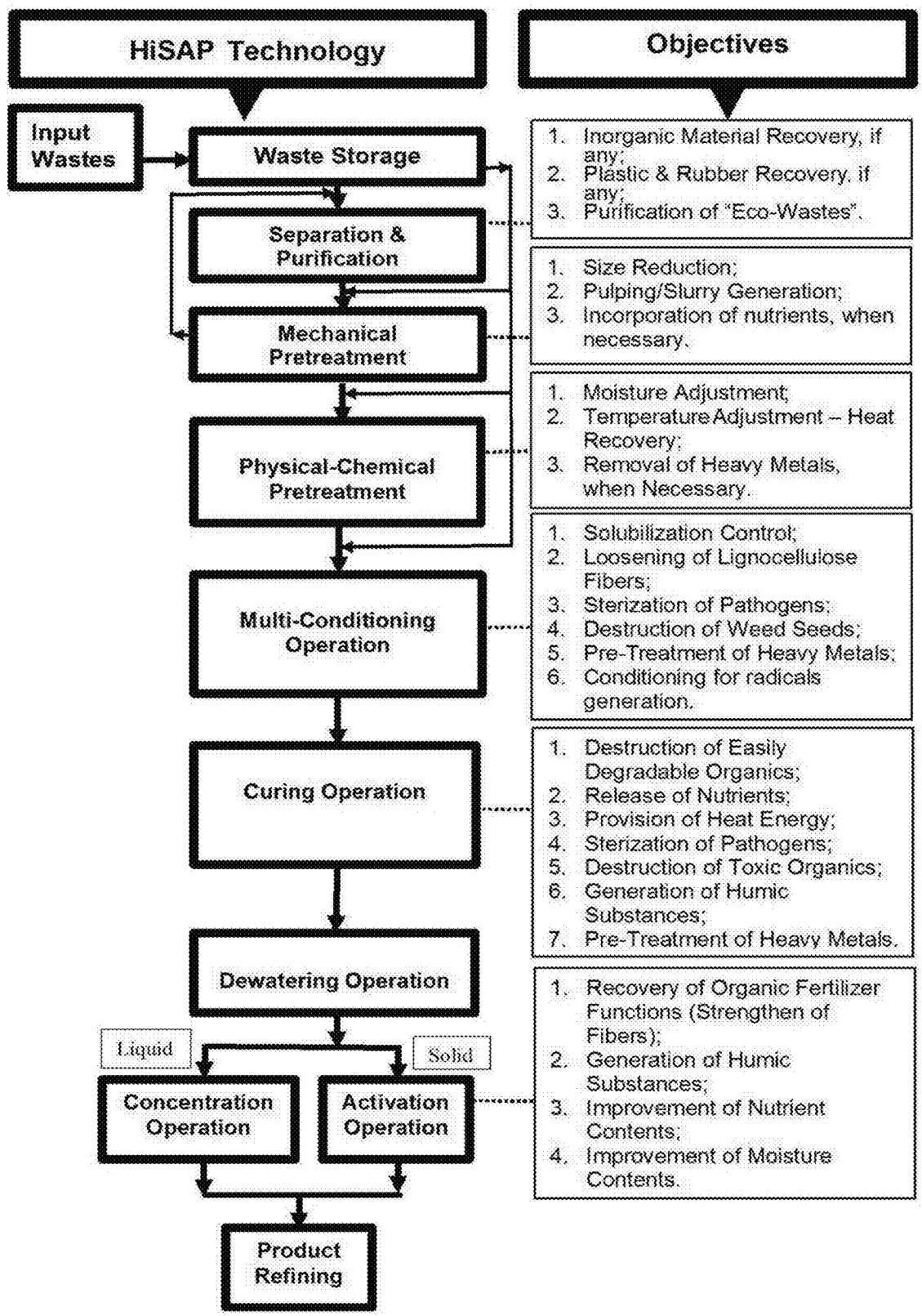
FIG. 1 is a block flow diagram showing major operation processes and objectives of each process of the present invention.

Major operation procedures and their objectives for the present invention is shown in the block flow diagram in FIG. 1. As shown in FIG. 1, Waste Storage Facilities are provided for incoming organic wastes to be treated. Tanks can be selected as the Storage Facilities if odor is a problem such as in the treatment of municipal sludge case. If closed tanks cannot be used, such as in the treatment of MSW case, the Storage Facilities shall be in indoor designed with negative pressure and with air collection and treatment units to prevent odor problem.

As shown in FIG. 1, after the Storage Facilities, operations are provided for Separation and Purification of wastes to remove unsuitable or undesirable materials from the incoming wastes such as inorganic materials (glasses, metals) and refractory organics (plastics, rubber), if any. In general, MSW, restaurant wastes, and residential food wastes are the type of wastes which require detailed Separation and Purification operations.

The next step, Mechanical Pretreatment, is provided for further purification of incoming wastes and for shredding and grinding. This Mechanical Pretreatment operation also provides mixing function to homogenize waste contents and for blending of more than one type of waste, and/or for addition and mixing of other additives into the treatment system. The type of equipment used in the present invention will turn the waste stream into slurry/pulps by the Mechanical Pretreatment operation. Organic wastes including agricultural wastes, dead animals, and green wastes (gardening wastes) may require pretreatment of shredding and grinding operations. These wastes may be mixed with the MSW and treated together or grinded into fine particles (usually less than 2 to 3 mm) and delivered directly to the Eco-Waste storage tank as discussed below. The wet processing method will be further discussed, infra. The above operations together are considered as the Pretreatment Operations. Wastes such as sludge, human night soils, animal wastes, landfill leachates, and other high organic contents wastes with fine particles can be pumped to the Eco-Waste storage tank directly without the need for pretreatments.

Result of the above Pretreatment Operation system will produce "Eco-Waste" slurries suitable for the next system called HiSAP in the present invention. Major unit processes of HiSAP Operation start with a Physical-Chemical Pretreatment, as shown in FIG. 1, mainly for moisture adjustment, temperature adjustment (heat recovery), further size adjustment, pretreatment of heavy metals when necessary, and further loosening of fibrous materials and preconditioning of the materials such as adding Wetting and Debonding Agents for loosening of lignocelluloses fibers, as in CN101508603B.

The next operation procedure will be the Multi-Conditioning Operation (also called Thermal Operation) which is performed with the following objectives: (1) Solubilization (hydrolysis) of "Easily Degradable Organics", (2) Loosening of lignocelluloses fibers, (3) Sterilization of pathogens, (4) Destruction of weed seeds, (5) Pretreatment of heavy metals, and (6) Pre-Conditioning for ROS treatment and generation of organic radicals.

Following the Multi-Conditioning Operation, the Curing Operation is provided. This step is the most important steps in HiSAP operation. At least the following seven objectives can be achieved by the Curing Operation: (1) Destruction of "Easily Degradable Organics", (2) Release of nutrients (include all major N, P, K nutrients, medium-amount nutrients of Ca, Mg, S, and minor nutrients of Fe, B, Mn, Cu, Zn, Mo, Cl, etc.) from waste materials, (3) Generation and provision of heat energy, (4) Sterilization of pathogens, (5) Destruction of toxic organics, (6) Generation of humic and fluvic acids and other plant stimulating agents for growing, and (7) Pretreatment of heavy metals.

After Curing Operation, most of the "Easily Degradable Organics", toxic organics, and other nuisances (such as odor, weed seeds, pathogens) are removed. The remaining materials after Curing Operation are mostly lignin and celluloses which are subject to a dewatering operation, to generate both solid and liquid organic fertilizers. In order to enhance quality of products, or to produce special commercial organic fertilizers, product refining processes are selected after the HiSAP system. For the enhancement of solid organic fertilizers generated, the Activation Operation is provided. The Activation Operation is for the increase and strengthen of solid fertilizer functions, such as improvement of adsorption/absorption capabilities, increase of humic substances contents, adjustment of moisture contents, and adjustment of nutrient contents.

After the Activation Operation, a wide variety of solid organic fertilizers can be produced. For the enhancement of liquid organic fertilizers generated, a series of concentration, catalytic oxidation for humic substances generation, and addition of indigenous microorganisms can be practiced producing various types of liquid organic fertilizers.

2. Processes and Equipment Involved in the Overall Recycling System

Figure 2:
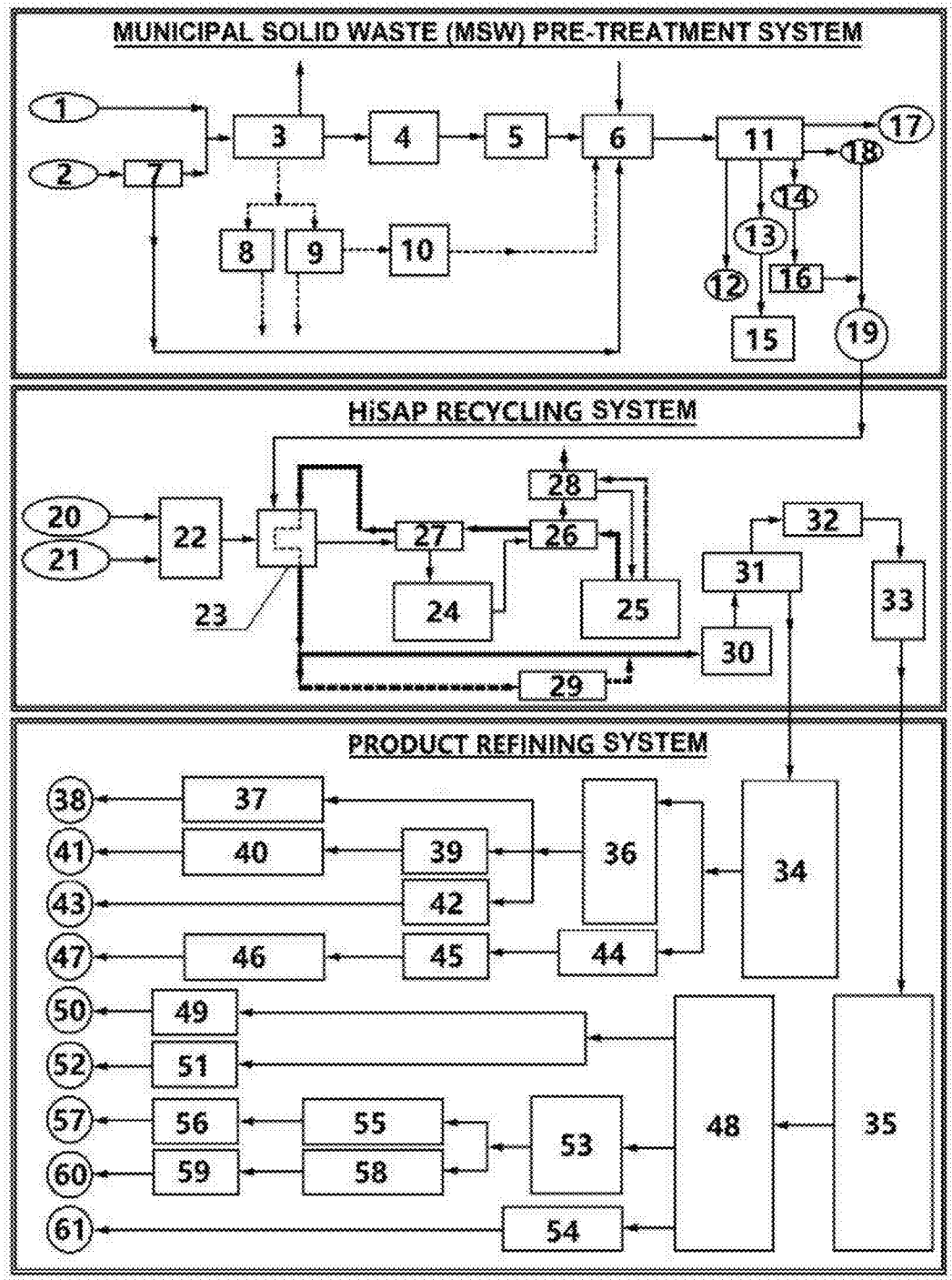
FIG. 2 shows embodiments of co-treatment and recycling of MSW and other wastes, such as biosolids, night soil, agricultural wastes, and animal wastes, as well as layout of treatment processes of the three systems, i.e., pretreatment system, HiSAP system, and product refining system, involved for an overall recycling plant.

Based on operation principles, objectives and procedures as discussed above, detailed recycling unit processes of an overall recycling plant are further delineated in FIG. 2. The unit processes used for an overall recycling plant are varied depend on types of wastes and specific waste characteristics to be recycled. However, a complete recycling plant developed by the present invention usually includes three types of system: pretreatment system, HiSAP system, and product refining system.

Different recycling/separation processes are selected in the pretreatment system according to different types of incoming wastes to be treated. In the pretreatment system, MSW and biosolids wastes are two extremes: MSW requires most extensive unit processes for pretreatment, but biosolids almost don't need any pretreatment system. FIG. 2 presents an embodiment of overall three systems involved and unit processes used for co-recycling of MSW and biosolids or other types of wastes which apply the present invention.

As shown in FIG. 2, the pretreatment system is required for the MSW recycling, which eventually generates Eco-Waste Slurry (indicated as 19 in FIG. 2) at the end of the pretreatment system. Most of the individual equipment and unit processes specified in the pretreatment system are commonly used and/or commercially available and, therefore, equipment drawings are not provided in the present invention. For MSW containing moisture contents lower than 45% (indicated as 1 in FIG. 2), a receiving sump 3 is used for storage of MSW waste 1. When moisture contents of MSW 2 is higher than 45% (such as, household wastes or restaurant wastes generated in Far East areas usually contain 65 to 70% moisture contents) a dewatering press 7 is used before storing in the receiving sump 3. In this case the squeezed water from incoming wastes can be used as dilution water and pump to a "Wet Separation Control Tank" 6. In the receiving sump 3 indoor area, sub-areas 8 and 9 are also provided and set aside for the large objects separation and removal.

If the large objects are inorganic in nature (such as discarded refrigerators and other appliances) they are stored in area 8 for off-plant recycling. For the large organic objects (such as wooden furniture, textiles objects) are stored in area 9. The large wooden objects are delivered to a series of shredder and grinder 10 to reduce the particle sizes to less than 1 mm and deliver to the Wet Separation Control Tank 6. Other large objects are delivered to outside recycling facilities. Emissions collected from the receiving sump 3 area are send to a conventional air pollution control device for treatment. Wastes in the receiving sump 3 is processed through a large plastic Bag Breaker 4 to reduce sizes to less than 10 cm, and then continue using a shredder 5 to reduce sizes to approximately 3 to 5 cm (note: sizes too small could affect the separation of plastic and paper/wood pulps in the following process). The size separation processes can be controlled by screens adjusting to desirable openings, such as using multiple rotary screens (trommels) or vibration screens to obtain particles in the 3 to 5 cm, less than 3 cm, and greater than 5 cm ranges for different subsequent processing. The less than 3 cm fraction usually contains very small amount of plastics and can be further shredded/grinded to less than 1 cm and deliver to the Wet Separation Control Tank 6. The greater than 5 cm fraction can be further shredded to 3 to 5 cm range and send to the Wet Separation Control Tank 6 for the Wet Pulping and Separation Apparatus 11 for plastic removal and pulp/slurry generation.

Figure 9A:
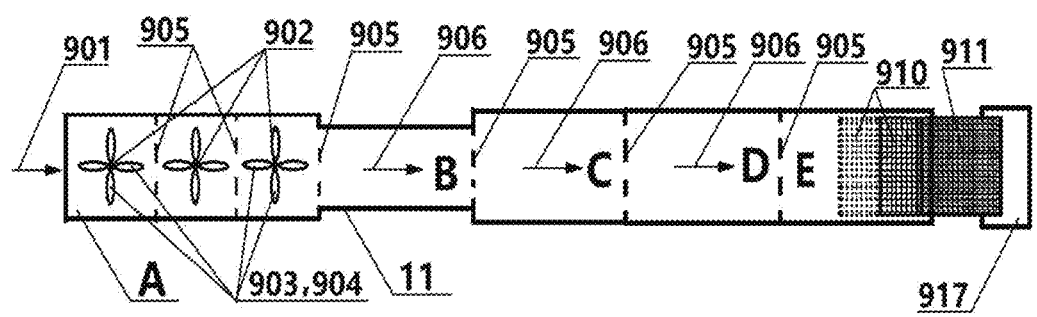
FIG. 9A shows a top view of an embodiment of the wet pulping and separation apparatus of the present invention.
Figure 9B:
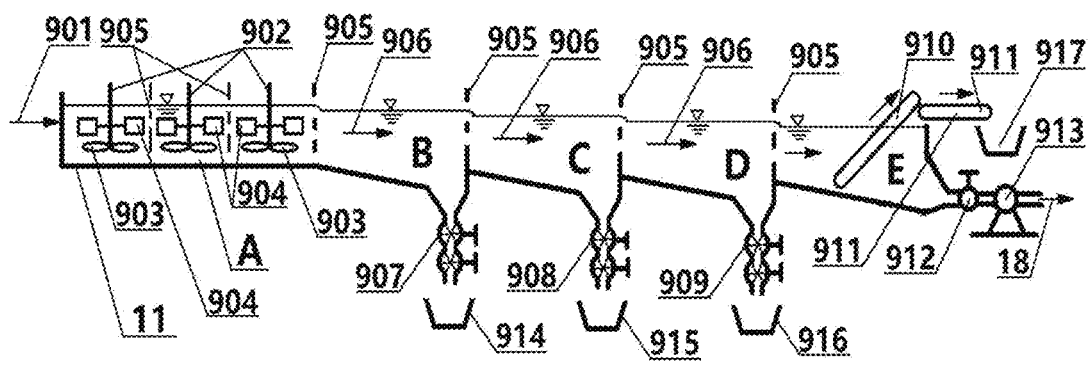
FIG. 9B shows a cross sectional view of the embodiment of the wet pulping and separation apparatus of the present invention.

The Wet Separation Control Tank 6 is provided for equalization, moisture adjustment and mixing. The Wet Pulping and Separation Apparatus 11 is a "wet separation" device including at least five compartments, as shown in FIGS. 9A and 9B: Mixing Compartment A (to generate pulp/slurry), Metal Collection Compartment B (for collection of Metal Materials 12, which the specific gravity >3), Glasses and Sands Collection Compartment C (for specific gravity between 2 to 3, which are mainly Glass and Sands Materials 13), Bones Collection Compartment D (specific gravity between 1.3 to 2, which are mainly Bone Materials 14). The remaining objects (specific gravity is usually in the range of 0.8 to 1.2) in Wet Pulping and Separation Apparatus 11 will be separated in the Compartment E, mainly mixtures of Plastics Materials 17, and Pulps and Slurry Materials 18, which can be separated by moving screen devices with openings approximately 1 to 1.5 cm attached near the end of Wet Pulping and Separation Apparatus 11. The Pulp and Slurry Materials 18 collected are stored in a storage Tank 19 (called Eco-Wastes Storage Tank). The Glass and Sands Materials 13 collected can be further processed by conventional Concrete Brick Manufacturing Machines 15 to produce bricks. The Bones Materials 14 collected containing valuable fertilizer ingredients and can be processed by a Grinder 16 to produce powders and delivered to Tank 19. All equipment used in the pretreatment system discussed above can be acquired commercially except the Wet Pulping and Separation Apparatus 11. Equipment used for process 11 (Wet Pulping and Separation Apparatus 11) is developed by the present invention, as shown in FIGS. 9A and 9B.

The unit processes involved in the HiSAP Recycling System (Plant) of the present invention is shown in FIG. 2. The HiSAP system starts from an incoming waste receiving tank 22, which provides a storage facility to contain wastes without the needs for pretreatment, such as biosolids (municipal sludge) 20 and human night soil 21. These wastes in tank 22 and eco-wastes in tank 19 from the pre-treatment system can be co-treated at any ratios blended in the physico-chemical pre-treatment tank 23.

Other wastes such as agricultural waste and animal wastes also can be treated together but may require pretreatment mainly for size reduction to about <5 mm sizes, preferably <2 mm, most preferably <1 mm, and mixed in tank 23. Wastes in tank 23 are moisture adjusted to about 85 to 90%, mixed and pre-heated to about 80 to 90° C. and then deliver to a heat exchanger 27 to further increase temperature to >140° C. when possible before entering into the Multi-Conditioning Reactor (or called Thermal Reactor) 24.

The temperature in Reactor 24 is adjusted to approximately 140 to 180° C. by the heat-pipe heat exchangers and a conventional heater 803, when necessary. Pressure of the Multi-Conditioning Reactor 24 is the related saturated steam pressure corresponding to the water temperature in the Reactor. After reactions proceeded in Reactor 24 (principles and apparatus to be further discussed later) the material is then pumped through another two heat exchangers 26 and 28.

The heat exchanger 26 is a liquid-liquid heat exchanger, which the higher temperature fluid is from the Curing Reactor 25. The heat exchanger 28 is a liquid-gas heat exchanger, where the higher temperature gas (steam) is from the gas phase of Curing Reactor 25. Heat Pipe heat exchangers are provided for both liquid-liquid, and liquid-steam heat exchange to maximize energy recovery.

The pre-heated material by the two heat exchangers as discussed above is then pumped to the Curing Reactor 25 for reaction. The most favorable temperature range of the Curing Reactor is 190 to 210° C., depending on types of wastes treated. Wastes containing more quantity of Easily Degradable Organics favor lower range of the above temperature range. The pressure of the Curing Reactors 25 are controlled at 3 to 3.5 MPa, although no upper limits are required. The treated material from the Curing Reactor 25 is then pumped through heat exchangers 26 and 27 for energy recovery. The remaining heat in the treated material is recovered in the Physico-Chemical Reactor 23 by a coiled pipe. This cooled material is then pumped to an Equalization Tank 30 for temporary storage waiting for dewatering by a pressurized filtration unit 31.

If heavy metal concentrations are too high (higher than the regulation limits for fertilizer products), the cooled material can be treated by a Three-Step Metal Extraction and Removal Method: The first step is used when the heavy metal concentrations are not significantly high (means, usually less than 100% beyond the legal limits of heavy metal concentrations in the finished fertilizer products). This first step can be automatically achieved by the Multi-Conditioning Reactor 24 and Curing Reactor 25 to solubilize metals due to the low pH (usually in the range of 4 to 5) generated in these Reactors. The solubilized metals in the liquid fraction of the treated wastes can then be removed by a conventional process 29 such as ion exchange after separation by the dewatering apparatus 31. Most of the waste materials, if metals are exceeding the above mentioned legal limits, can usually be removed below the legal requirements by this first step practice. In this way, only the first step is needed for the heavy metal removal.

If after the first step the metal concentrations are still exceeding the legal requirements, the second step can be used. This step is practiced right before the dewatering operation in the HiSAP system, using nitric acid to reduce the pH lower than 1 (usually 1% concentrated nitric acid is sufficient for most treated wastes) in a mixing tank to further solubilize the heavy metals. Nitric acid is used because the resulting nitrate can be a fertilizer ingredient in the product produced. Again, the solubilized metals can be removed from the liquid stream by conventional metal removal methods such as ion exchange as shown above.

When the second step is still cannot remove heavy metals down below legal limits, the third step is used. The third step involves an Acid/Chelating Extraction Device or an Electrokinetic Heavy Metal Removal device 29 (such as devices used for soil remediation practiced widely in the field) before pumping to the Equalization Tank 30. The solid/liquid mixtures stored in tank 30 can then be dewatered by applying a filter press 31 and adjusted the moisture contents of the solid portion to about 40 to 45% moisture contents and send to the Activation Reactor 32 for high-pressure steam activation processing, with or without additives.

After that the material is through a Steam-Explosion Device 33 to further improve the quality of the solid fertilizer products. The liquid portion from the filter press 31 is pumped to the storage facility 34 in the Product Refining Plant, as shown in FIG. 2. All equipment used in the HiSAP system discussed above will be further delineated in FIG. 3.

The Product Refining Plant shown in FIG. 2 is provided to further improve the quality and generate a wide variety of both liquid and solid fertilizers. Due to the unique characteristics of both liquid and solid fertilizer base materials generated by the HiSAP system, it is possible to produce almost any types of organic fertilizer products, which most of the traditional methods cannot achieve. This refining system starts from two Storage Facilities 34 (for liquid fertilizer base material storage) and 35 (for solid fertilizer base material storage). The liquid fertilizer base material in storage tank 34 can be processed through different processes as shown in FIG. 2 to generate at least four types of different liquid fertilizers.

One process is to remove extra VOCs (volatile organics) and unwanted ions (such as extra salts or heavy metals) through a conventional salts/metals removal device 36. This treated liquid fluid from device 36 can then be processed in different ways for different liquid fertilizer types as shown in FIG. 2. For example, through adjustment of major fertilizer ingredients (N, P, K), secondary fertilizer ingredients (Ca, Mg, S), and trace ingredients (minor nutrients of Fe, B, Mn, Cu, Zn, Mo, Cl, etc., shown previously) in a Mixing Device 37 to produce Ordinary Liquid Fertilizer 38, or through Concentration Device 39 (such as use commercially available MVR device, to reduce liquid product volume 5 to 10 times so the product transportation costs can be reduced) and adjust nutrients in a Mixing Device 40 to produce Concentrated Liquid Fertilizer 41, as most liquid fertilizers commercially available.

The treated liquid in 36 mentioned above also can be pumped to a "Beneficial Bacteria Culturing Device" 42, through bacteria culturing by selected bacteria addition and aeration operation to generate Bio-Liquid Fertilizer 43, which is used widely in the developing countries due to lack of microorganisms in their farmland by overuse of pesticides and herbicides. The treated liquid 36 above can also increase the humic and fulvic contents by Humic/Fulvic Reactor 44 (a mixing tank for adding commercially available humic substances or a ROS oxidation tank to increase the humic substances concentrations through the oxidation of lignocelluloses in the treated liquid from storage tank 34) and Concentration Device 45 and nutrients adjustment device 46 to produce Liquid Humic Fertilizer 47. Through tests, it is found that the low temperature conventional MVR devices can be used as the concentration devices 39 and 45.

Moisture content is one of important parameters in the organic solid fertilizer products. The solid fertilizer base material in storage 35, can be moisture adjusted by a Moisture Adjuster 48 to adjust moisture contents of the base materials based on requirements by various fertilizer standards required by most regulatory agencies. The moisture adjuster can be a filter press for moisture reduction or a mixing tank for moisture addition depending on incoming and outgoing moisture requirements. The moisture contents of materials through the filter press 31 usually can be dewatered down to 25% when necessary.

Further processing by moisture adjuster 48 includes pelleting by a conventional Pelletizer 49 to produce regular pelletized Solid Fertilizer 50 or grinding to powders by a commercially available grinder 51 to produce powdered Solid Fertilizer 52. The material through moisture adjustment by moisture adjuster 48 also can be further processed by Humic/Fulvic Reactor 53, to generate Humic Fertilizers 57 and 60. pelletized Solid Humic Fertilizer 57 is pre-treated by a nutrient adjuster 55, and a Pelletizer 56. powdered Solid Humic Fertilizer 60 is pre-treated by a nutrient adjuster 58, and a Grinder 59. The moisture adjusted product from moisture adjuster 48 also can be processed by mixing with beneficial bacteria Culturing Device 54 to produce Bio-Solid Fertilizer 61.

Equipment needed for the Product Refining Plant as shown in FIG. 2 are mostly commercially available and therefore are not provided in the present invention. Nine types of solid and liquid organic fertilizer products, as listed in FIG. 2, represent most of the new types of organic fertilizers can be selected for production by the Product Refining Plant of the overall HiSAP system. Through years of tests by pilot and demonstration plants using the HiSAP principles, it has found that functions and characteristics of fertilizer products discussed above are quite similar no matter what types or sources of organic wastes are treated. This is because that, after the treatment of organic wastes through the HiSAP thermal and curing reactors, all the different Easily Degradable Organic species in the fertilizer products are mostly decomposed, and the remaining organic fertilizer's backbone materials, i.e., mainly lignin and celluloses, are similar in structures and therefore exhibiting similar characteristics.

3. HiSAP Equipment and Instruments

Figure 3:
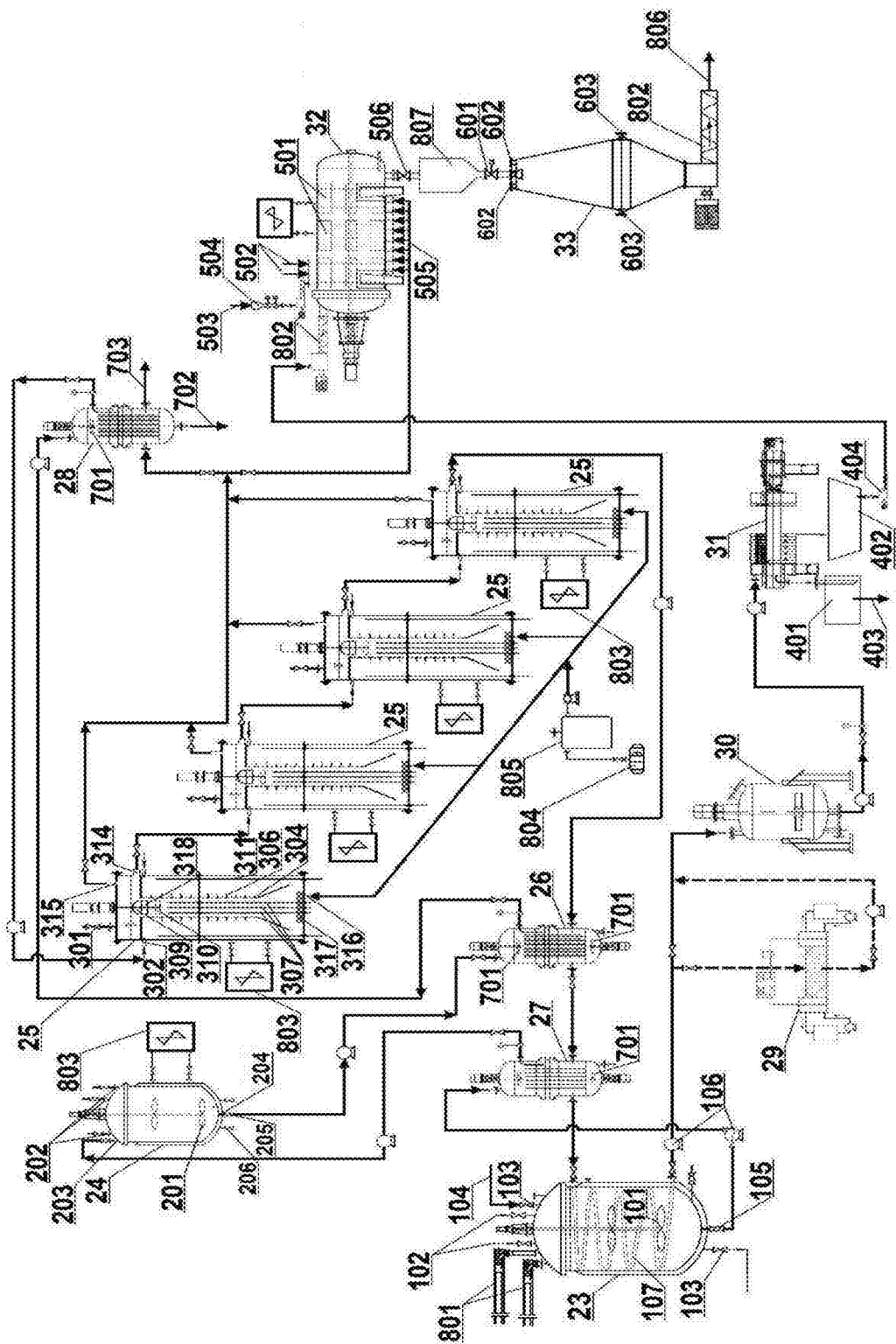
FIG. 3 is a process and instrument diagram showing the HiSAP system of the present invention.

Major equipment and instruments used for the HiSAP system are shown in FIG. 3. The major processes and functions provided by the listed equipment and instruments are also described herein.

Figure 4A:
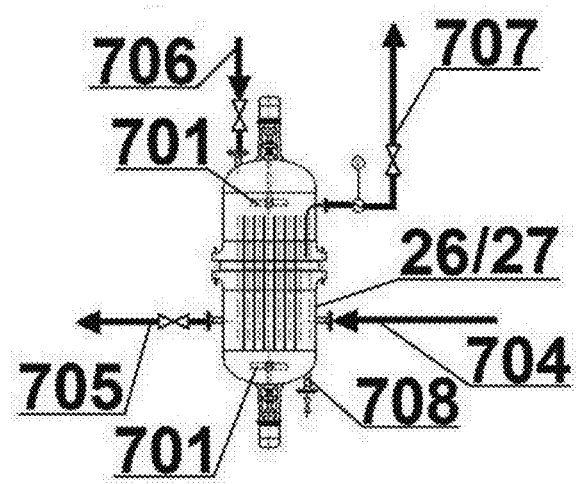
FIG. 4A shows the liquid-liquid heat-pipe exchangers in an embodiment of the improved heat-pipe exchanger designs used for energy recovery in the present invention.

The incoming eco-wastes, biosolids, and/or other types of pretreated organic wastes are transported to and mixed in the physico-chemical pretreatment tank 23 through a conventional belt or a screw conveyer 801. Other types of material such as additives are inputted through openings 102, and dilution water 104 is inputted through and controlled by valve 103. The input materials are then mixed in the tank 23 by a mixer 101. Temperature of the material in tank 23 is raised by a heating coil 107 through waste heat recovery to a temperature as high as possible or until about 80 to 95° C. The processed materials are then outputted through a liquid-liquid heat-pipe exchanger 27 (as shown in FIG. 4A) by a control valve 105 and a pump 106. In the liquid-liquid heat-pipe exchanger 27, mixers 701 are installed in the heat exchanger both near the top and bottom inside the exchanger to prevent settling of particulates. The relative cold fluid from tank 23 is inputted through the top compartment of the exchanger as shown in FIG. 4A.

The heated fluid is then pumped to the multi-conditioning reactor 24 through input opening 203. Additives, if needed, can be added through openings 202. The inputted materials are mixed by a mixer 201, and output. A heater 803 is provided to adjust the temperature when temperature cannot be reached to the desired levels (usually in the range of 140 to 170° C., depending on types of degradable materials to be treated).

Figure 5:
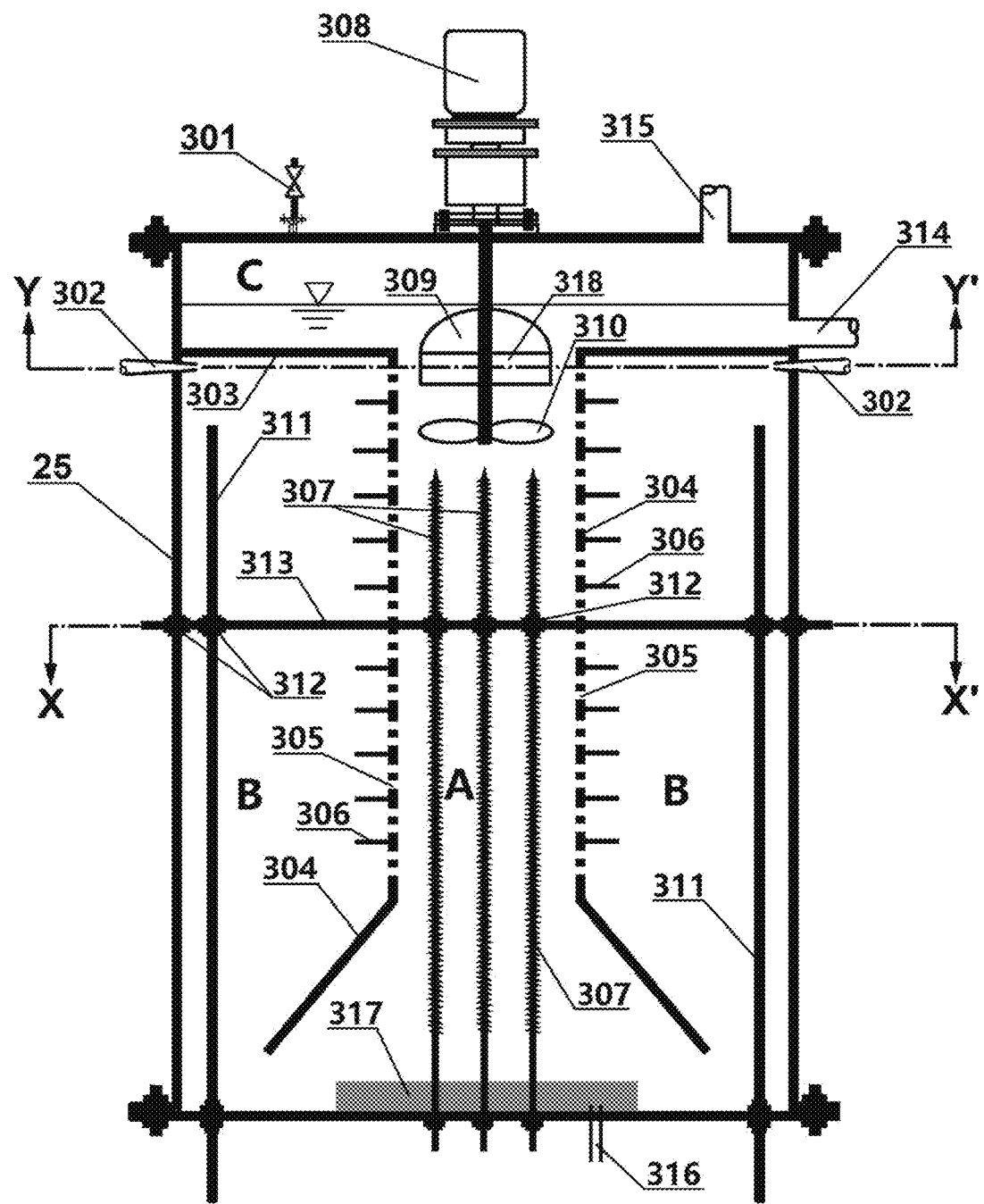
FIG. 5 shows an embodiment of the curing reactor in the present invention.
Figure 6A:
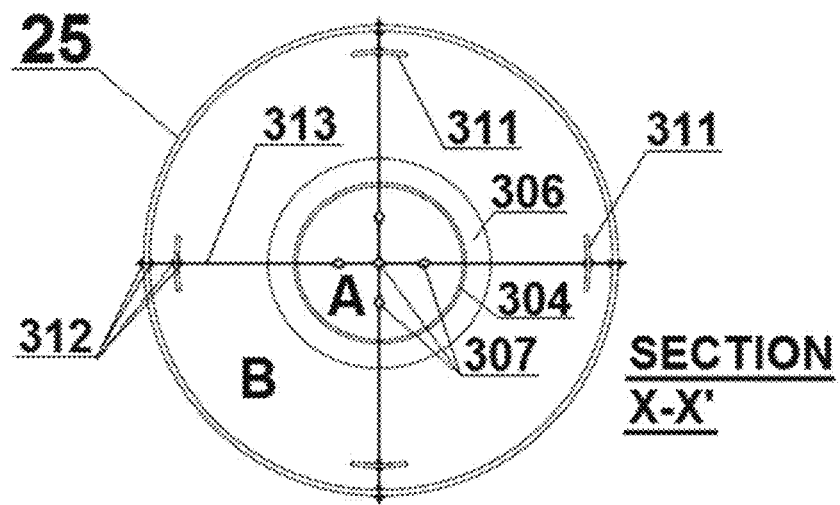
FIG. 6A shows a cross-sectional view of X-X' of the curing reactor in the present invention.
Figure 6B:
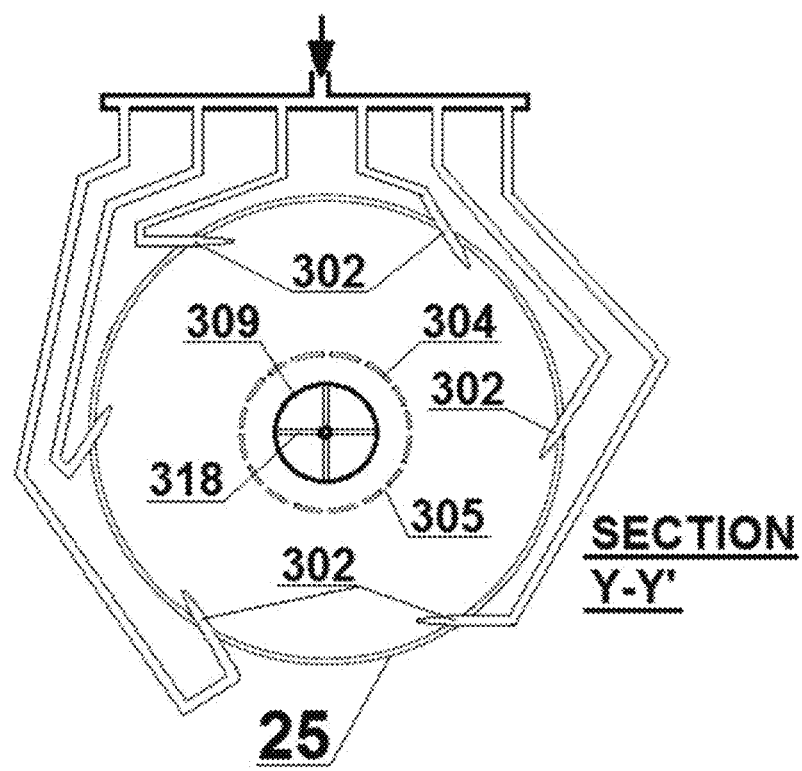
FIG. 6B show a cross-sectional view of Y-Y' of the curing reactor in the present invention.

The output of the two-phased materials (slurry) through valve 205 are pumped through a second liquid-liquid heat-pipe exchanger 26, and then through a liquid-gas heat-pipe exchanger 28 to raise temperatures of the slurry for inputting into the first Curing Reactor 25 through a series of Nozzles 302 (as shown in FIGS. 5 and 6B). The inputted slurry is forced to become a turbulent flow circulating in the outer zone (Zone B as also shown in FIG. 5) of the curing reactor 25 and contact a plurality of Anode Plates 311. The curing reactor 25 is temperature controlled by a heater 803, when necessary. When organic wastes contain enough quantity of easily degradable organics or properly controlling various operational parameters, oxidation can be proceeded rapidly, necessary temperature levels can be build up by proper design of the curing reactor 25.

The slurry in the Zone B of the curing reactor 25 is circulated downward and mixed with air and ROS (generated mainly in Zone A and by the Cylindrical Catalyst Device 304) to form a three-phase fluid and further forced to circulate downward in the Zone B until reach the bottom of the curing reactor 25, and the fluid then flows upward to Zone A (shown in FIG. 5) guided by a Cylindrical Catalyst Device 304. Pressurized air or oxygen is inputted through opening 316 and distributed through an Air Diffuser Device 317. The pressurized air stream is mixed with the slurry to form a three-phase fluid and flow upward in Zone A.

The three-phase fluid contacts a plurality of Cathodes 307 to form various of ROS (principles are discussed in Section 6) and organic radicals. The fluid is then forced by a Mixing and Circulating Device 310 to flow through Openings 305 (shown in FIG. 5) of the Cylindrical Catalyst Device 304 to form more hydroxyl radical and then guided by Flow Guiding Plates 306 to further mixed with the fluid in Zone B. The undissolved air in Zone A can be retained by the Air and Steam Control Device 309 and forced to Zone B by an Air and Fluid Recirculating Device 318. The treated fluid is then flowing upward and exit through Opening 314 to the second Curing Reactor 25.

A series of multiple curing reactors 25 range from 1 to 4 are used (refer to FIG. 3). For wastes containing more easily degradable organic species or wastes containing less amount of easily degradable organics the number of curing reactor can be reduced. The treated fluid exits from the very last curing reactor is pumped through the Liquid-Liquid Heat-Pipe Exchanger 26 to heat the stream from Multi-Conditioning Reactor 24 for energy recovery. The treated fluid is then pass through another Liquid-Liquid Heat-Pipe Exchanger 27 to heat the stream from the Physico-Chemical Pre-Treatment Tank 23 through a Heating Coil 107, as described before. The treated fluid through the Heating Coil 107 is then pumped to an Equalization Tank 30, waiting for dewatering by a Filter Press 31. If concentrations of heavy metals in the treated fluid are higher than the organic fertilizer products regulated by fertilizer standards, a three-step method as discussed above can be used to remove heavy metals, and then pumped to the Equalization Tank 30.

A commercially available Filter Press 31 can be used to separate the treated fluid into two types of materials, one is a solid organic fertilizer stored in a Container 402 and another is a liquid organic fertilizer stored in Container 401. Through numerous product curing tests and plant growing tests, the inventor found that qualities of these two types of fertilizer product are very high, usually higher than conventional composts produced by biochemical methods based on various organic fertilizer quality tests.

To further improve the quality of solid organic fertilizer products, the product stored in container 402 can be transfer to an Activation Reactor 32 by a Screw Conveyer 404 and then transfer to a Steam Explosion Device 33 through an Explosion Control Device 807 for further processing.

The Activation Reactor 32 (shown in FIG. 3) can be a continuous or a batch operation. Steam generated from the Curing Reactor(s) 25 can be pumped into the Activation Reactor 32 for product activation processing through a series of input Steam Distribution Holes 505 to achieve the objectives as discussed previously. Any powder types of additives can be added to the Activation Reactor 32 through a Powder Additive Input Opening 503 controlled by a Double Air-Lock Device 504. Any liquid types of additive can be added through Liquid Additive Input Openings 502.

A series of specially designed Cup-Shaped Mixers 501 (refer to FIG. 3) arranged along the reactor shaft are provided to throw the bottom material in the reactor to the steam phase in the reactor to enhance the activation. After 10 to 20 minutes of steam activation process, as discussed above, material in the reactor is then dropped to an Explosion Control Device 807 by Automatic Output Control Valves 506 and 601 to control timing and quantity of batch material for steam explosion in the Steam Explosion Device 33. Steam Exit Openings 602 are provided for the exit of steam. This pressure reduced steam can be collected by a conventional hood device and pump to a conventional air pollution control device (not shown). Air Inlet Openings 603 are provided to recover the pressure of the Steam Explosion Device 33 back to atmospheric level. Exploded Material 806 is then sent to the product refining system by a Screw Conveyer 802.

4. Energy Recovery Equipment

Figure 4B:
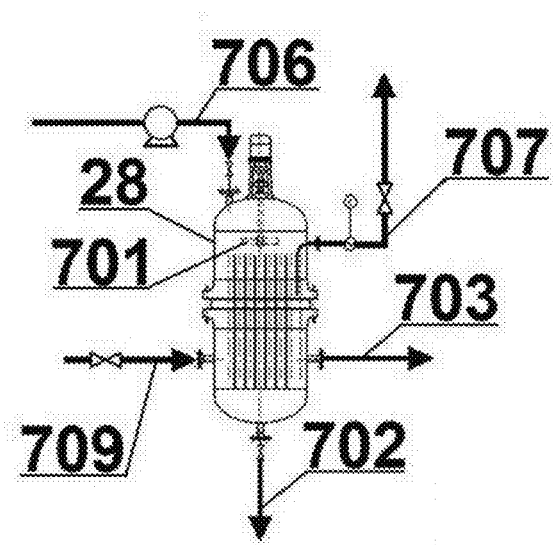
FIG. 4B shows the liquid-gas heat-pipe exchanger in the embodiment of the improved heat-pipe exchanger designs used for energy recovery in the present invention.

Specially designed Heat Pipe Exchangers 26, 27, and 28 are selected for energy recovery, as shown, respectively, in FIGS. 4A and 4B. Selection of heat-pipe types of exchangers instead of conventional heat exchangers are tested and considered necessary by the present invention due the reason that, if air is used for the oxygen supply, significant amount of air in the steam inside the Curing Reactors 25 can greatly reduce the heat exchange efficiency by air as insulator in the conventional heat exchange system. Therefore, in the present invention, two types of heat pipe designs are provided to prevent heat exchange problem. The Liquid-Liquid Heat-Pipe Exchangers 26 and 27 are shown in FIG. 4A, and Liquid-Gas Heat-Pipe Exchanger 28 is shown in FIG. 4B. Fluid Mixers 701 are provided in both top and bottom compartments of Heat Pipe Exchanger 26 and 27, to prevent settling of particulates. Input Hot Fluid 704 is pumped into the lower compartment, and Out Fluid 705 exit from the other side of the lower compartment. The Input Colder Fluid 706 is pumped into the top compartment of the exchanger, and the Output Heated Fluid 707 is exit from the other side of the exchanger. A Drain 708 is provided for cleaning purpose.

The Liquid-Gas Heat-Pipe Exchanger 28, as shown in FIG. 4B, is used for the heat recovery from the hot steam generated by the Curing Reactor 25. The Hot Steam 709, which contains high quantity of air is inputted into the lower compartment of the exchanger and the Colder Steam 703 exit from the other side of the exchanger. The Input Colder Fluid 706 is pumped into the top compartment of the exchanger and the Output Fluid 707 exit to the other side of the compartment. A Fluid Mixer 701 is provided in the top compartment of this exchanger to prevent settling of particulates. No mixer is needed for the bottom compartment for this type of exchanger. A Condensate Drain 702 is provided to remove the condensed liquid away.

5. Principles and Equipment Design of the Multi-Conditioning Reactor

As shown in FIG. 1, six functions/objectives are involved for the Multi-Conditioning Reactor 24. The first objective is to achieve the solubilization of Easily Degradable Organics. This objective is important that solubilization of organic compounds in this Reactor 24 can enhance the decomposition of the Easily Degradable Organics in the following Curing Reactor 25. The Easily Degradable Organics in the wastes mainly contain nuisance compounds which can cause secondary pollution problems, but also contain valuable plant nutrients and heat energy which can be recovered. Since ROS generated in the Curing Reactor 25 are non-specific for the oxidation/decomposition of organics and are mainly effective for the soluble organic species, the Reactor 24 is required to solubilize Easily Degradable Organics and leave the Moderately Degradable Organics mainly in particulate forms. Partial solubilization of Moderately Degradable Organics is also considered favorable, because, oxidation of these soluble species will convert into humic substances.

In years of pilot tests, it has been found that soluble organics can be oxidized by ROS easily and rapidly if the contact opportunity between the soluble organics and ROS is provided. Mixing and Circulating Device 310 (refer to FIG. 3), as discussed previously, is for the improvement of contact opportunity.

Non-soluble organic species existed as particulates will usually be partially oxidized only on the particle surfaces. The larger the particle sizes, the slower rates and less chances for the attack by ROS. However, particle sizes of Moderately Degradable Organics in the Reactor 25 cannot be too large due to the fact that: (1) large particles tends to trap Easily Degradable Organics in the particles, such as agricultural wastes which some protein, fat, and starch would be trapped in the lignocelluloses, which cause the degradation by ROS impossible; (2) large particles tend to reduce the functions of organic fertilizers during agricultural applications which trapped the celluloses in the hemicelluloses and/or lignin and therefore reduce the effectiveness of the organic fertilizers. The most ideal situation is to break the lignocelluloses fibers, expose and oxidize the hemicelluloses, and loosen the cellulose fibers to the extent that dissolution of celluloses will not occur. A carefully controlled shredding and grinding operation and selective solubilization by the Multi-Conditioning Reactor 24 can be utilized for the subject objectives. The most ideal particle sizes in the above situations are less than 2 mm sizes.

The affecting factors of the above stated dissolution effects, besides the particle size (or surface area), other factors such as temperature, pH, agitation, redox potentials, solution composition, and solubility of the species itself will also affect the solubilization. Among them, temperature, particle size and agitation are controllable factors and can be incorporated into the reactor design. Mixers 201 (as shown in FIG. 3) are provided in the Multi-Conditioning Reactor 24 for agitation and particulates settling prevention purposes. In the design, mixing rates for the Eco-wastes slurry are kept larger than average of 100 cm/sec of linear revolution speed.

The above-mentioned temperature control is based on hydrolysis and/or dissolution temperatures required for Easily Degradable organics. Different Easily Degradable Organics in the wastes require different operation temperature to hydrolyze. Hydrolysis temperature and period required for hydrolysis are two most important variables of concern for design of the Multi-Conditioning Reactor 24 for the solubilization of Easily Degradable Organics.

Among the Easily Degradable Organics, protein decomposition is most critical, because, these species associate with most secondary pollution sources such as odor, pathogens, and parasites. Hydrolysis of proteins will form mainly, amino acids, oligopeptides, carbohydrate side chains from glycoproteins, racemized proteins, etc. Our tests have found that most of the proteins can be hydrolyzed at temperatures above 120° C., majority of proteins can be hydrolyzed when temperature reaches 180° C., and almost all proteins are hydrolyzed at temperature reaching 230° C.

As for fats in the incoming wastes, portion of complex fats will liquefy at room temperature, and at temperature beyond 80° C. most fats can be liquidized. When temperature greater than 180° C. majority of complex fats can be hydrolyzed into fatty acids and simple fats.

As for the carbohydrates in the incoming wastes, hydrolysis in the Reactor 24 results in hydrolyzed glycogen (major glucose polymers from animal wastes), hydrolyzed starch (major glucose polymers from plant wastes), and simple sugars (such as glucose, galactose, mannose), etc. According to rough estimates, depends on types of wastes, approximately 55 to 65% of carbohydrates in food wastes can be hydrolyzed when temperature reaching 140° C., additional 25 to 35% of carbohydrates in wastes can be hydrolyzed reaching 140° C. to 230° C., and less than 10% remaining amount of carbohydrates need to be hydrolyzed at temperature beyond 230° C.

Time needed for hydrolysis will depend on temperature, concentration, pH, particle sizes, etc. For most Eco-Wastes, period required from minutes to about 2 hours, when particle size is less than 5 mm and temperature within 140 to 230° C. However, the hydrolysis time can be reduced with the aid from acidic hydrolysis. To avoid over hydrolysis to reduce the production amount of solid organic fertilizer products, appropriate temperature range used is 140 to 180° C. In this temperature range hemicelluloses and a small portion of lignin of the lignocellulosic materials can also be hydrolyzed.

Experiments found that cellulosic materials can be significantly hydrolyzed only when the temperature higher than 250° C. The hydrolysis of celluloses is undesirable due to the reason that quantity of solid organic fertilizer products will be reduced. Therefore, the hydrolysis temperature is controlled under 250° C. in this design.

When temperature reaches 200° C., toxic organics, such as dioxin, benzene, PAH's, PCB's, pesticides, insecticides, herbicides, etc., in the organic wastes also can be effectively hydrolyzed.

In general, the above-mentioned hydrolysis reactions can be completed from few minutes to about 2 hours. The more desirable hydrolysis conditions are selected at temperature from 140 to 180° C. and reaction period 2 minutes to 1 hour. The most desirable hydrolysis conditions for the design of the Multi-Conditioning Reactor 24 will be 150 to 170° C. and 10 to 30 minutes. Although the toxic organics as discussed above cannot be effectively solubilized, the ROS generated in the Curing Reactor 25 can add the decomposition of these compounds.

Other objectives of the Multi-Conditioning Reactor 24, such as loosening of lignocelluloses, sterilization of pathogens, and destruction of weeds in wastes can also be accomplished in the Reactor by the application of elevated temperature as discussed previously. Hydrolysis of organics will cause reduction of pH levels of the slurry in the Multi-Conditioning Reactor 24. For the types of organic wastes mentioned above (such as MSW, restaurant wastes, animal wastes, biosolids, etc.) the pH levels of the slurry in the Multi-Conditioning Reactor 24 can be reduced to 4 to 5. This pH levels are favorable for the dissolution of heavy metals associated in the organic solid wastes. If concentration levels of heavy metals in the solid phases of the wastes are only moderately higher than the levels required by the regulation for use as fertilizers, dewatering of the wastes after the curing process (to be discussed in the following section) could reduce the heavy metal concentrations in the solid organic fertilizers produced due to the acidification effects of dissolution of metals in the Multi-Conditioning Reactor 24.

The solubilized metals in the liquid phase can then be treated by conventional metal removal methods, such as ion exchange method. It is also reported in the open literature that the thermal chemical reactions in the reactors such as the conditions existed in the Multi-Conditioning Reactor 24 will also generate organic free radicals which can assist in breakdown the C—C and/or C—H bonds organics to further increase solubilization effects. Experiments have found that organics in the Multi-Conditioning Reactor shall be kept in reducing environments (i.e., negative redox potentials) to enhance the generating of organic radicals.

6. Principles and Equipment Design of the Curing Reactors

Equipment profiles of the Curing Reactor 25 are shown in FIGS. 5, 6A, and 6B. As shown in FIG. 5, pressurized air or oxygen is injected into the Zone A of the Curing Reactor 25 through an Air Input Opening 316 and breakdown into tiny air bubbles by the Air Diffuser Device 317 to increase the rate of oxygen dissolution. When the oxygen in the air is contacted the electron from the Cathode 307, due to the bi-radical characteristics of oxygen that has strong affinity for electron, one oxygen molecule (in this case more accurately is one dissolved oxygen molecule) can rapidly accepts one electron and form $O_2^-$ (Super Oxygen Anion), as graphically shown in FIG. 7 and expressed by the formula below:

$$O_2 + e^- \rightarrow O_2^- \tag{1}$$

$O_2^-$ is reactive and can catch a $H^+$ ion rapidly and form HOO. (Peroxyl radical or Hydrogen Peroxide Radical):

$$O_2^- + H^+ \rightarrow HOO. \tag{2}$$

Formation of HOO. also will avoid the generation of hydrogen gas from the system (which is different from the conventional electrolysis reaction of water to generate hydrogen gas). HOO. is unstable and will obtain another $e^-$ and form $HOO^-$:

$$HOO. + e^- \rightarrow HOO^- \tag{3}$$

$HOO^-$ will catch another $H^+$ to form $H_2O_2$ (Hydrogen Peroxide):

$$HOO^- + H^+ \rightarrow H_2O_2 \tag{4}$$

Figure 7:
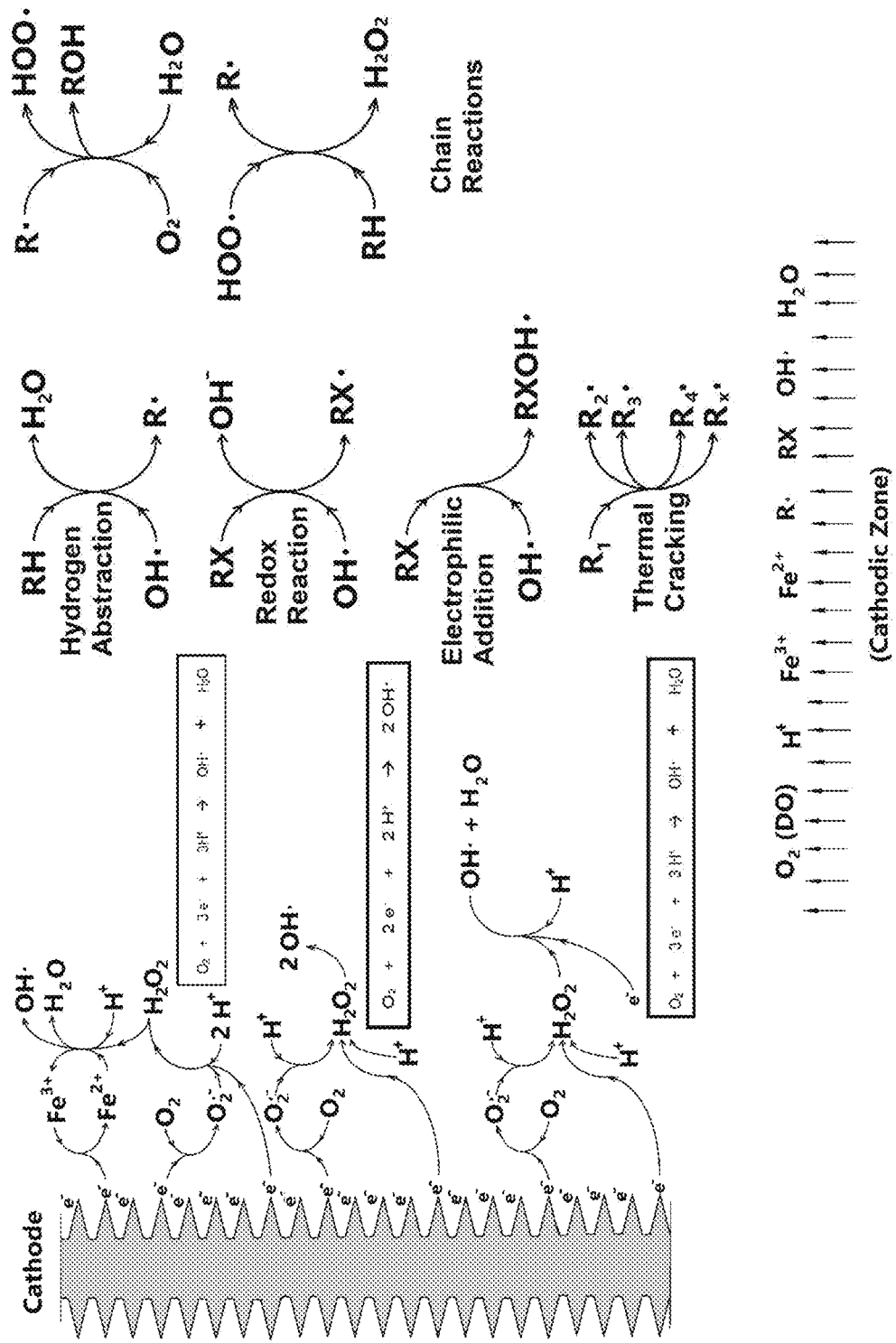
FIG. 7 shows reactions in Zone A in the present invention.

In the HiSAP system, three types of major reactions may occur near the surface of the Cathode 307, as shown in FIG. 7, after the formation of $H_2O_2$: (a) $H_2O_2$ obtain another $e^-$, (b) $H_2O_2$ gives two Hydroxyl Radicals OH., and (c) $H_2O_2$ reacts with reduced species such as $Fe^{2+}$ and organic species. The above (a) type reaction will form $OH^-$ and OH., as shown in Equation (5):

$$H_2O_2 + e^- \rightarrow OH^- + OH. \tag{5}$$

The above $OH^-$ formed will catch $H^+$ and form Water $H_2O$:

$$OH^- + H^+ \rightarrow H_2O \tag{6}$$

Combination of Equations (5) and (6) will form:

$$H_2O_2 + e^- + H^+ \rightarrow OH. + H_2O \tag{7}$$

The overall reaction of the above (a) type from Equation (1) to (4) and (5) would give the above pathway's overall reaction happen in the bulk solution in Zone A: (Hereinafter referred to as A-Type reactions in Zone A:)

$$O_2 + 3e^- + 3H^+ \rightarrow OH. + H_2O \tag{8}$$

The above (b) type reaction will yield 2 OH.:

$$H_2O_2 \rightarrow 2OH. \tag{9}$$

The overall reaction will result: (B-Type in Zone A:)

$$O_2 + 2e^- + 2H^+ \rightarrow 2OH. \tag{10}$$

The above (c) type reaction will form various types of oxidized species and breakdown of organic species, such as an example for oxidation of $Fe^{2+}$:

$$H_2O_2 + Fe^{2+} + H^+ \rightarrow Fe^{3+} + OH. + H_2O \tag{11}$$

The above Equation (11) is the well-known Fenton Reaction. Since $e^-$ can be supplied from the cathodes continuously by the HiSAP design, $Fe^{3+}$ in the bulk solution in Zone A formed above can be reduced again to carry on more Fenton Reactions, as shown below:

$$Fe^{3+} + e^- \rightarrow Fe^{2+} \tag{12}$$

The overall reaction of the above (c) type will become: (C-Type in Zone A:)

$$O_2 + 3e^- + 3H^+ \rightarrow OH. + H_2O \tag{13}$$

From the above three types of reactions, the phenomena occur in Zone A of the Curing Reactor 25 initiated by injection of oxygen, supply of electron, and existence of hydrogen ion, is for the purpose of forming more of the hydroxyl radical in Zone A. Some of the intermediate species produced during various pathways of reactions shown above are extremely short life. Therefore, major species in the Zone A of the reactor, excluding the input materials, may include mixtures of $O_2$, $H_2O_2$, OH., $e^-$, $Fe^{2+}$, $Fe^{3+}$ (iron species may come from the catalyst provided, to be discussed later), $H_2O$, and organics. These species may react rapidly in Zone A when they are in soluble forms. The Easily Degradable Organics are mostly hydrolyzed in the Multi-Conditioning Reactor 24 in soluble forms prior to the Curing Reactor 25, so will decompose through a series of chain reactions in Zone A. Any of the dissolved lignocelluloses in Zone A may start to oxidize also, although majority of the lignocelluloses, especially lignin and celluloses, are still in the insoluble particulate phases.

Through the mixing action in Zone A, and the recirculation of the fluid up flow in Zone A from Zone B as shown in FIG. 5, the partially decomposed species will be forced to circulate through Opening 305 of the Cylindrical Catalyst Device 304 and guided by Catalyst and Fluid Guiding Plates 306 for increasing contact opportunities between fluid and catalyst. Since the catalyst materials selected in this Curing Reactor 25 are iron, iron compounds, or iron complexes, the ROS can be continuously formed. The ROS generated in Zone A such as $H_2O_2$, and OH. are much more reactive than that of oxygen used in the systems of CN101508603B, and CN104148357A (by comparing the oxidation potentials, OH. is 2.8 volts, $H_2O_2$ is 1.78 volts, and $O_2$ is only 1.23 volts). In fact, OH. has the highest oxidation power among all oxygen related oxidation species in the nature. These ROS can also initiate many series of chain reactions for the decomposition of organics as shown in FIG. 7.

The fluid migrates from Zone A to Zone B in the Curing Reactor 25 will be oxidized further due to catalyst(s) provided on the Cylindrical Catalyst Device 304, which through Fenton Reaction will generate more OH. for oxidation of soluble organic species. Continuing generation of OH. is necessary since OH. reactions are extremely fast and unstable and so OH. only diffuses in a short distance. Mixing, recirculation, and Fenton reactions can continue supply of more OH. for oxidation of species in the Curing Reactor 25.

Figure 8:
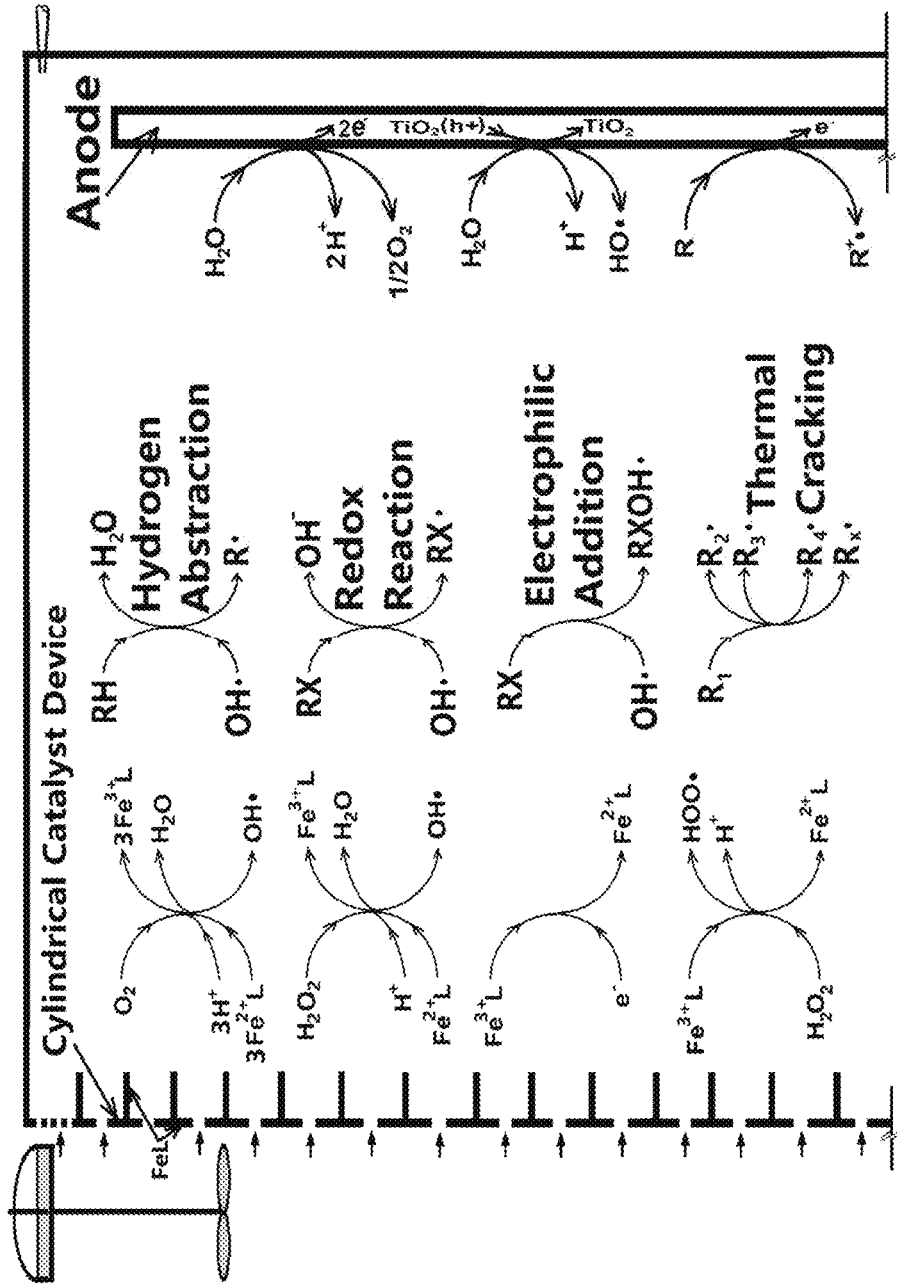
FIG. 8 shows reactions in Zone B in the present invention.

In Zone B in the Curing Reactor 25, the influent slurry from the Multi-Conditioning Reactor 24 is distributed through a plural of Input Nozzles 302, as shown in FIGS. 5 and 6B. The nozzles are arranged at different locations along the circumference (as shown in FIG. 6B), near top of the Curing Reactor 25 (as shown in FIG. 5) and injected tangentially to create vortex and cavitation effects by forming micro bubbles through air/dissolved oxygen carrying from previous Curing Reactor designed in series. The Control Plate 303 and inputting slurry from Input Nozzle 302 will force the vortex to circulate gradually downward in Zone B. This input vortex slurry will mix with the fluid from Zone A and dissolved organics in Zone B will start to oxidize due to supply of oxygen and ROS especially OH. from Zone A. When the mixed fluid is circulating and contacting Anodes 311, due to the voltage applied to the electric circuit, electrons will be carry away by Anodes. These electrons are mainly generated on or near the surface of Anodes 311 by dissociation of water, as graphically shown in FIG. 8, and shown by the equation below:

$$H_2O \rightarrow \tfrac{1}{2}O_2 + 2H^+ + 2e^- \tag{14}$$

Due to the formation of vortex, and high pressure (usually near 2.5 to 3.2 MPa of operating pressure provided by the subject design) in the Curing Reactor 25, oxygen generated by the Equation 14 reaction will be mainly in a dissolved form (DO). The $H^+$ ion generated by Equation 14 and generated from the Multi-Conditioning Reactor 24 will be forced to flow from Zone B to Zone A for the consumption by various reactions (refer to Equations 8, 10, and 13) discussed above.

Equation 13 shows that consumption of each $O_2$ molecule require 3 $e^-$. Equation 14 indicates that generation of each $O_2$ will contribute 4 $e^-$. Therefore, the DO generated in the Zone B (as shown in Equation 14), by theoretical evaluation, would provide ¾ of the oxygen needs in the Curing Reactor 25. As a result, supply of compressed air or oxygen from Input Opening 316 can be theoretically reduced 75%. In fact, the savings of compressed air would be larger than 75% due to the reason that only portion of $O_2$ (usually 70 to 80% depending on the reactor design) in the compressed air phase can be effectively turn into DO. This situation explains why HiSAP can be much more effective and cost saving comparing to that of the systems of CN101508603B and CN104148357A.

In Zone A near the surface of Cathodes 307, the regular water electrolysis may form $H_2$ gas. However, at the presence of oxygen, based on the Equation 13 generation of OH. instead of $H_2$ will occur. The free energy of Equation 13 can be calculated to be −67.28 Kcal, negative value implying that reaction of oxygen and hydrogen ion to form OH. are more thermodynamically favorable. On the surface of Cathodes 307 reduction of $Fe^{3+}$ to $Fe^{2+}$ (Equation 12) occurs which will carry on the Fenton Reactions (Equation 11) to continue generating OH. also. In fact, the type of Fenton Reactions will occur throughout the entire Curing Reactor 25, i.e., in bulk solutions in Zones A and B, surfaces of both Electrodes (generation on the surface of anodes will be further discussed later), and near the areas and on surfaces of the Cylindrical Catalyst Device 304. This special equipment design of the Curing Reactor 25 is very favorable and effective to generate ROS to enhance the oxidation of Easily Degradable Organics.

ROS production in the Curing Reactor 25 is limited by the concentration of DO and availability of electron supply (or current density) in the system. Almost all currently available patented ROS reactor designs are for water or air purification and sterilization purposes. These water or air purification devices are operated at or near atmospheric pressure and at or near room temperatures. Therefore, the DO levels in these systems are relatively low (Note: saturation concentration of DO at room temperature under atmospheric pressure is only about 8 ppm). As for solid wastes treatment, so far no solid wastes partial wet oxidation or wet oxidation processes are using ROS approach. Since solid wastes contain much higher concentrations of organics in the treatment systems than that of water and air purification systems, carrying the ROS reactions in the room temperatures and under atmospheric pressure will result in shortage of DO in the system. To increase the concentration of DO, and enhance the oxidation reaction rates of ROS, the present invention develops and uses the thermal pressurized reactors. The high pressure provided by the Curing Reactor 25 can increase the DO levels. The screw shaped Cathodes 307 (refer to drawing in FIG. 5) are provided throughout the entire Zone A to facilitate the discharge of electron into the solution where DO is readily available.

As discussed above, hydrogen ion is also needed for the generation of hydroxyl radical. Relative low pH levels resulted from the reactions in the Multi-Conditioning Reactor 24 and Curing Reactor 25 can increase the hydrogen ion concentrations and, therefore, increase the OH. formation rates and concentrations, as shown in Equations 13 and 14. The elevated temperature provided can further increase the oxidation rate of reaction.

In the solid waste treatment, as discussed in the background section, due to high organic contents, oxidant demands are very high. Using premixed oxidant gases prepared at or only slightly higher than atmospheric pressures cannot reach to the dissolved oxidant levels needed. For treatment/recovery of solid wastes, use of pressurized reactors and operation at elevated temperatures and pressures are needed. Provision of fluid recirculation to increase the oxidation efficiencies are also necessary.

In the present invention, the Curing Reactors 25 are operated in closed and oxidation environments with careful evaluation of waste characteristics and bench test results to obtain the ranges of elevated temperature and pressure to achieve the seven objectives of Curing Reactor 25 described in FIG. 1. Selection of suitable elevated pressures can increase saturation levels of DO to the sufficient ranges for complete oxidation of Easily Degradable Organics, and selection of elevated temperatures can increase rate of reactions, so oxidation of the Easily Degradable Organics can be done in less than few hours.

The temperature-pressure relationships VS requirements of detention time, supply and demand of oxidants for the destructions of Easily Degradable Organics in the reactor(s) of the present invention can be bench tested before full-scale design of the reactor. Based on that and the waste mass flow rates, the needs of oxidant supply and electric current density can be estimated. For most organic wastes tested so far by the present invention it is found that the most favorable temperature fall in the 180 to 210° C. range.

For the selection of pressure, higher pressures favor higher saturated DO levels and thus faster and better organic destruction efficiencies. Higher pressure used can also reduce steam generated in the pressurized reactor and, therefore, reduce the heat requirement. However, the higher the operating pressures used, the higher the capital and operation costs will be needed. Therefore, optimum conditions and feasibility shall be evaluated to select the best pressure ranges. In our tests and evaluations, the minimum pressure required is at least 0.5 MPa beyond the saturated steam pressure of the above listed temperature ranges, and maximum pressures are governed by capital and operating costs. More favorable pressure ranges can be selected for the Curing Reactor 25 are 3 to 3.5 MPa. Under these conditions the saturated DO levels will be in the range of 250 to 350 ppm, comparing to about 8 ppm in the room temperature, atmospheric conditions. In the above temperature and pressure ranges the detention time needed for the Curing Reactor 25 is in the range of 10 minutes to 1 hour.

The high-speed curing process is an exothermic reaction. For most Easily Decomposable Organics if the temperature selected is greater than 140° C. and easily decomposable organic contents are higher than 5%, and heat contents of the organics are greater than 3,000 Btu/pound, then no external heat energy supply is usually needed for the temperature maintenance of all the thermal reactors used in this HiSAP system. The steam generated through this process also enough for the supply to other operation processes which require steam such as High-speed Activation Process. In this way a great saving can be achieved by using the present invention for the organic fertilizer production.

Destruction of Easily Degradable Organics and most toxic and odorous components of the organic wastes such as ammonia, sulfides, and mercaptans can be oxidized to nitrate, and sulfate salts to eliminate odors and converted to valuable fertilizer components by the Curing Reactors 25. Viruses and other pathogens, parasites, weeds can be eliminated under series of high temperature hydrolysis and oxidation reactions in this HiSAP system. Due to the formation of organic acids, pH ranges after the hydrolysis and oxidation reactions are usually in 4 to 5 range. Higher levels of Easily Degradable Organics in the wastes, and selection of longer detention time for operation will lower the pH levels in the reactors. Control of pH levels in the 3 to 6 range is possible by selection of proper detention time and additives. If heavy metal extraction, or removal of certain compounds are necessary from the products, pH can be adjusted lower. Low pH will affect the selection of reactor and pipeline construction materials. Stainless steel in this case becomes unfavorable, due to corrosion problem which will weak the facilities and release toxic heavy metals such as chromium into the products. In these cases, materials such as titanium or hastelloy shall be used as the reactor manufacturing material to avoid corrosion and metal contamination problems.

Oxidation and destruction of Easily Degradable Organics, toxic organic compounds and minor portion of the hydrolyzed Moderately Degradable Organics in the Curing Reactors 25 can go through four pathways: (1) by hydrogen abstraction reactions, (2) by redox reactions, (3) by electrophilic addition to π bond, and (4) by thermal cracking, as shown graphically in FIGS. 7 and 8 in both Zones A and B in the Curing Reactor 25. All of the above reactions will form organic radicals, such as:

Hydrogen abstraction:

$$RH + OH\cdot \rightarrow R\cdot + H_2O \quad (15)$$

Redox reaction:

$$RX + OH\cdot \rightarrow RX\cdot^+ + OH^- \quad (16)$$

Electrophilic addition:

$$RX + OH\cdot \rightarrow RXOH\cdot \quad (17)$$

Thermal cracking:

$$R_1 \rightarrow R_2\cdot + R_3\cdot + \quad (18)$$

Radicals formed through above reactions can react instantly with oxygen to form peroxide derivative (ROO.):

$$R\cdot + O_2 \rightarrow ROO\cdot \quad (19)$$

ROO. may react with water to form HOO. (hydroperoxyl radical) and ROH, or react with another organic to form organic radical R. and ROOH. These reactions imply the destruction of organics and generate organic-organic chain reactions for further breakdown of organics, as follows:

$$ROO\cdot + H_2O \rightarrow ROH + HOO\cdot \quad (20)$$

$$ROO\cdot + RH \rightarrow ROOH + R\cdot \quad (21)$$

The above HOO. and R. can initiate further chain reactions, or form more $O_2$ and $H_2O_2$ again for further chain reactions, as shown bellows:

$$HOO\cdot + ROO\cdot \rightarrow RO\cdot + O_2 + OH\cdot \quad (22)$$

$$HOO\cdot + RH \rightarrow R\cdot + H_2O_2 \quad (23)$$

In summary, as long as radicals are existing in the Curing Reactor 25 system, chain reactions will proceed to breakdown organics until no radicals are in the system. In case all secondary radicals are all consumed while more organics are pumped into the system for treatment, the supply of $O_2$ and electron to the system will initiate above mentioned chain reactions again.

Suitable materials for the construction of cathodes and anodes of the Curing Reactors 25 are: (1) regular and precious metals, such as Fe, Al, Ti, Ni, Cu, Ag, Pt, Au, etc.; (2) alloys of the above metals; (3) graphite, reticulated carbon (glassy carbon), carbon-PTFE; (4) metal oxides, or mixture of metal oxides containing at least one transition metal; and (5) composite materials, such as titanium-ceramic-Ebonex, metals doped with inorganic material. Among the above electrode materials, Titanium, graphite, reticulated carbon, Hastelloy are better cathode materials can be used for the Curing Reactor 25. For the anode electrode materials, the better choices will be Fe, Ti, metallic oxides, or any semiconductor materials. Fe electrode is relative inexpensive and may help to generate hydroxyl radicals, but itself will be sacrificed and requiring frequent replacement. Titanium anode if can be coated with titanium dioxide not only can assist forming hydroxyl radicals, the electron ejected from the electrode surface forming an electron "hole" also can assist attracting soluble organics to the hole to form organic radicals, and thus further breakdown organics.

To further enhance the hydroxyl radical generation, Fenton reactions are created in the Curing Reactor 25 by a Cylindrical Catalyst Device 304. The cylindrical device has Fluid Recirculation Openings 305 and Catalyst and Fluid Guiding Plates 306 to recirculate and guide the fluid flow and increase the contact opportunities to enhance the reactions as shown in Equations 11 to 13 above. Suitable catalyst materials for the construction of the Cylindrical Catalyst Device 304 are Fe metal, Fe salts and Fe-complexes. In this Cylindrical Catalyst Device 304, Fe-salt catalysts can be selected from relatively insoluble iron compounds (either ferrous or ferric) of oxides, phosphates, polyphosphates, or pyrophosphates. For the Fe-complex catalysts, the following compounds can be selected: ligands containing polyphosphates or acetic derivatives of ethyleneamine, especially comprising EDTA and ethylenediamine. Thermally degraded lignocellulosic materials (can be formed in the Multi-Conditioning Reactor discussed above), or these materials, either in solid or liquid phases, forming complexes with iron and/or iron compounds can be good Fenton reaction catalysts also.

7. Principles and Equipment Design of the Wet Pulping and Separation Apparatus

The wet processing method is developed for the subject recycling system. As discussed previously, all equipment used in the pretreatment system can be acquired commercially except the Apparatus 11 (Wet Pulping and Separation Apparatus). The Wet Pulping and Separation Apparatus 11 is developed by the present invention and can be used for the separation and removal of heavy fractions (usually including materials in the incoming wastes which the specific gravity is greater than 1.3), including metals, glasses, dirt, bones from the incoming waste streams. The remaining waste fractions (usually the specific gravity is less than 1.3), which are mainly plastics, food wastes and lignocelluloses, if any, are processed to two distinct groups of wastes—one is a group of waste plastic material, and the other group is the major organic materials in the wastes including mainly food related wastes and lignocellulosic materials (also called Eco-Wastes mentioned previously). The above mention waste fractions can be effectively separated and recycled by using the Apparatus 11, as shown in FIGS. 9A and 9B. Details are explained below:

The Wet Pulping and Separation Apparatus 11 is operated based on the specific particle size range, specific gravity differences of different types of material, principles of hydraulics, and pulping and non-pulping characteristics of incoming wastes. As shown in FIGS. 9A and 9B, the incoming wastes 901 to the Apparatus 11 is pretreated to a particle sizes range of 3 to 6 cm and less than 1 cm from the Wet Separation Control Tank 6 explained previously. The Wet Pulping and Separation Apparatus 11 is divided into at least 5 compartments (indicated as A, B, C, D and E in FIGS. 9A and 9B) by Flow Guiding Plate 905. In the Compartment A, multiple mixers 902 are provided, and each mixer is rotating at different directions from that of the adjacent mixer(s). Each mixer include two types of rotating blades, the lower blade 903 is a propeller types of blade which is used to create flow at axial mixing direction. The top blade 904 is a turbine type of blade which create radial (horizontal) flow direction. Actions of these two types blades can prevent particle settling and enhance pulping formation. The Flow Guiding Plate 905 is used to create horizontal laminar flow 906 in Compartments B to E.

Metal Materials 12 (as shown in FIG. 2) collected in Compartment B are settled on a Double Water Locking Valve I (907), and then collected by a Metal Storage Container 914. Glass and Sands Materials 13 (as shown in FIG. 2) collected in Compartment C are settled on a Double Water Locking Valve II (908), and then collected by a Glass and Sand Materials Storage Container 915. Bone Materials 14 (as shown in FIG. 2) collected in Compartment D are settled on a Double Water Locking Valve III (909), and then collected by a Bone Materials Storage Container 916.

In the Compartment E, the Plastic Materials 17 (as shown in FIG. 2) are removed by an Inclined Screen 910 and a Horizontal Screen 911 and stored in a Plastic Storage Container 917. The best screening openings are tested as 1 to 1.5 cm, which can usually achieve over 97% of plastic removal efficiencies. The remaining Pulp and Slurry Materials 18 can be penetrated through the Inclined Screen 910 and pump out by a Pulp and Slurry Pump 913, and the flow can be controlled by a Control Valve 912.

The principles, treatment systems and major apparatus are fully described above, it will be apparent to one of ordinary skill in the art that many changes and modifications can be made thereto without departing from the spirit or scope of the appended claims.

I claim:

1. A method for producing organic fertilizers from organic solid waste material, comprising
   (1) pre-treating waste material, the pretreatment further comprising the steps of storing the waste material comprising one or mixtures of municipal solid wastes, restaurant wastes, gardening wastes, agricultural wastes, and dead animals,
   mechanically pretreating the waste material,
   wet pulping the stored waste material,
   recovering metals, glass, sands, bones, and plastics from the mechanically pretreated and wet pulped waste material,
   recovering wet pulps and food slurries from the mechanically pretreated and wet pulped waste material and forming wet pulps and food slurries, and
   storing the wet pulps and food slurries in a storage tank;
   (2) stabilizing and activating the wet pulps and food slurries and organic waste material that do not need pretreatment, the organic waste material that do not need pretreatment comprising one or mixtures of sludge, animal wastes, night soils, anaerobic digesting residues, and landfill leachates, by
   mixing and adjusting temperature and moisture in the wet pulps and food slurries and the organic waste material that do not need pretreatments to obtain mixed and adjusted organic waste material,
   multi-conditioning the mixed and adjusted organic waste material to obtain multi-conditioned organic waste material, wherein the mixed and adjusted organic waste material are treated for solubilization and destruction of easily degradable organics, loosening of lignocellulose fibers, sterilization of pathogens, destruction of weed seeds, dissolution of heavy metals, and conditioning for organic radical generation,
   waste curing the multi-conditioned organic waste material to obtain cured organic waste material, wherein the multi-conditioned organic waste material are treated for release of nutrients, generation of heat energy, destruction of toxic organics, generation of humic substances, and plant-grow-stimulating agents, and
   dewatering the cured organic waste material, wherein solid and liquid contents in the organic waste material are separated, to generate solid and liquid organic fertilizers, and
   (3) refining the solid and liquid organic fertilizers, the refining process further comprising the steps of
   activating and steam exploding, and nutrients adjustments of solid fertilizers, and
   concentrating, catalytic oxidizing and nutrient adjustments of liquid fertilizers,
   wherein refined organic solid and liquid fertilizers are generated.

2. The method for producing organic fertilizers from organic solid waste material as described in claim 1, wherein the stored organic waste material are the municipal solid wastes, and the stored municipal solid wastes are treated with the wet pulping and separation step; wherein the municipal solid wastes are processed to particles at a particle range of 3 to 5 cm and particles at a particle size of less than 1 cm and are further processed in a wet pulping and separation apparatus having multiple compartments for multiple material removal,
wherein metals are removed and recovered in a first compartment of the wet pulping and separation apparatus based on specific gravity in a range of greater than 3; rocks, sands, and glasses are removed and recovered in a second compartment of the wet pulping and separation apparatus based on specific gravity in a range of 2 to 3; bones are removed and recovered in a third compartment of the wet pulping and separation apparatus based on specific gravity in a range of 1.3 to 2; and plastic materials and pulps and slurry material are recovered in a fourth compartment of the wet pulping and separation apparatus based on specific gravity in a range of less than 1.3, and wet pulps and food slurries are further separated from the plastic materials by a moving screen device with openings in a size of approximately 1 to 1.5 cm attached to the end of the wet pulping and separation apparatus.

3. The method for producing organic fertilizers from organic waste material as described in claim 1, wherein a multi-conditioning reactor is used for the multi-conditioning step and for thermal solubilization of protein, fats, starch, and toxic organic compounds in the waste, leaving lignin and celluloses in particulate forms, destroying pathogens and weed seeds, dissolving metals, and generating organic radicals through chain reactions to further breakdown organics, and
the multi-conditioning reactor is operated under conditions of controlling in a reducing environment with negative redox potentials, pretreating incoming wastes by solubilizing easily decomposable organics by thermal hydrolysis and liquefaction; and generating organic radicals and promoting chain reactions; and increasing temperature to a range of 140 to 180° C. by heat-pipe heat-exchange devices before entering the multi-conditioning reactor by using heat generated from the waste curing step; maintaining pressure at the related saturated steam pressures; and adjusting retention time of the multi-conditioning reactor at a range from a few minutes to about 2 hours.

4. The method for producing organic fertilizers from organic solid waste material as described in claim 1, wherein the multi-conditioned organic waste material are cured in a curing reactor in presence of reactive oxygen species (ROS) to obtain cured organic waste material, the curing reactor comprises cathodes and anodes,
   wherein the ROS comprises superoxide, hydroperoxyl radical, hydrogen peroxide, and hydroxyl radical
   the multi-conditioned waste material are distributed to the curing reactor through a plurality of high pressure input nozzles to generate turbulent flows and creating cavitation effects by forming micro bubbles;
   the ROS are created by contacting by dissolved oxygen with electron from the cathodes and hydrogen ion from the anodes in the curing reactor;
   enhancing the ROS generation by Fenton Reactions with a vertical cylindrical catalyst device arranged in cylindrical shape with flow distributing and contacting catalyst opportunity in the curing reactor;
   providing about ¾ of oxygen needs by a series of multiple anodes arranged along inside wall of the curing reactor with semiconductor electrodes;
   forming of organic radicals and through chain reactions to continuously decompose soluble forms of organics to assist in curing of organics and generation of plant-growth stimulating-agents;
   maintaining temperature range at room temperature to 210° C.;
   maintaining the minimum pressure of the reactor to 0.5 MPa beyond the saturation pressure of steam formation in the curing reactor to increase ROS levels and keep the curing reactor cost-effective; and
   decomposing soluble organics by reactions of hydrogen abstraction, redox reaction, electrophilic addition, and thermal cracking.

5. The method for producing organic fertilizers from organic solid waste material as described in claim 1, further comprising
   removing heavy metal from the solid and liquid organic fertilizers after the dewatering step and before the refining process by solubilization and ion exchange.

6. The method for producing organic fertilizers from organic solid waste material as described in claim 1, wherein a product refining system is used in the refining process to generate solid and liquid organic fertilizers without presence of microorganisms to avoid species invasion, or to treat the fertilizer products by adding beneficial bacteria or microorganisms.

7. The method for producing organic fertilizers from organic solid waste material as described in claim 1, wherein the organic fertilizers are refined solid organic fertilizers comprising pelletized solid organic fertilizer, powdered solid fertilizer, pelletized solid humic fertilizer, powdered solid humic fertilizer, and biosolid fertilizer.

8. The method for producing organic fertilizers from organic solid waste material as described in claim 1, wherein the organic fertilizers are refined liquid organic fertilizers comprising liquid fertilizer, concentrated liquid fertilizer, bio-liquid fertilizer, and concentrated liquid humic fertilizer.

* * * * *